United States Patent
Cao et al.

(10) Patent No.: US 12,553,044 B2
(45) Date of Patent: Feb. 17, 2026

(54) METHYLATION DETECTION AND ANALYSIS OF MAMMALIAN DNA

(71) Applicant: Changping National Laboratory, Beijing (CN)

(72) Inventors: Yunlong Cao, Beijing (CN); Xiaoliang Xie, Beijing (CN)

(73) Assignee: Changping National Laboratory, Beijing (CN)

( * ) Notice: Subject to any disclaimer, the term of this patent is extended or adjusted under 35 U.S.C. 154(b) by 762 days.

(21) Appl. No.: 17/771,265

(22) PCT Filed: Oct. 25, 2019

(86) PCT No.: PCT/CN2019/113387
§ 371 (c)(1),
(2) Date: Apr. 22, 2022

(87) PCT Pub. No.: WO2021/077415
PCT Pub. Date: Apr. 29, 2021

(65) Prior Publication Data
US 2022/0389412 A1      Dec. 8, 2022

(51) Int. Cl.
C12Q 1/68       (2018.01)
C12N 15/10      (2006.01)
C12Q 1/6806     (2018.01)

(52) U.S. Cl.
CPC ....... *C12N 15/1082* (2013.01); *C12Q 1/6806* (2013.01)

(58) Field of Classification Search
None
See application file for complete search history.

(56) References Cited

U.S. PATENT DOCUMENTS

| | | | |
|---|---|---|---|
| 4,683,195 A | 7/1987 | Mullis et al. | |
| 4,683,202 A | 7/1987 | Mullis | |
| 4,965,188 A | 10/1990 | Mullis et al. | |
| 5,684,143 A | 11/1997 | Gryaznov et al. | |
| 5,858,988 A | 1/1999 | Wang | |
| 6,291,438 B1 | 9/2001 | Wang | |
| 6,432,360 B1 | 8/2002 | Church | |
| 6,485,944 B1 | 11/2002 | Church et al. | |
| 6,511,803 B1 | 1/2003 | Church et al. | |
| 7,425,431 B2 | 9/2008 | Church et al. | |
| 9,624,538 B2 | 4/2017 | Church et al. | |
| 9,738,922 B2 | 8/2017 | Bestor et al. | |
| 2007/0281313 A1 | 12/2007 | Taniguchi et al. | |
| 2008/0102452 A1* | 5/2008 | Roberts .............. | C12N 15/70 435/6.12 |
| 2008/0269068 A1 | 10/2008 | Church et al. | |
| 2009/0047680 A1 | 2/2009 | Lok | |
| 2011/0287435 A1 | 11/2011 | Grunenwald et al. | |
| 2013/0017978 A1 | 1/2013 | Kavanagh et al. | |
| 2013/0203605 A1 | 8/2013 | Shendure et al. | |
| 2013/0244237 A1 | 9/2013 | Vaisvila et al. | |
| 2018/0087050 A1 | 3/2018 | Zheng et al. | |
| 2018/0355348 A1 | 12/2018 | Adey et al. | |
| 2022/0282242 A1 | 9/2022 | Steemers et al. | |

FOREIGN PATENT DOCUMENTS

| | | | |
|---|---|---|---|
| CN | 101802223 A | 8/2010 | |
| CN | 102105483 A | 6/2011 | |
| CN | 108300766 A | 7/2018 | |
| EP | 2527438 A1 | 11/2012 | |
| EP | 2376517 B1 | 1/2013 | |
| GB | 2202328 A | 9/1988 | |
| JP | 2018501776 A | 1/2018 | |
| WO | 899284 A1 | 10/1989 | |
| WO | 9810077 A1 | 3/1998 | |
| WO | 2005082098 A2 | 9/2005 | |
| WO | 2006073504 A2 | 7/2006 | |
| WO | 2012106546 A2 | 8/2012 | |
| WO | 2015113725 A1 | 8/2015 | |
| WO | 2016073690 A9 | 9/2017 | |
| WO | 2018057779 A1 | 3/2018 | |
| WO | WO-2018165366 A1 * | 9/2018 | ............ C12N 15/00 |
| WO | 2018217912 A1 | 11/2018 | |
| WO | 2018226708 A1 | 12/2018 | |

OTHER PUBLICATIONS

English language abstract for CN 101802223 A extracted from espacenet.com database on Sep. 20, 2023, 1 page.
English language abstract for CN 102105483 A extracted from espacenet.com database on Sep. 20, 2023, 1 page.
English language abstract for JP 2018-501776 A extracted from espacenet.com database on Dec. 30, 2023, 2 pages.
Buenrostro, J. et al., "Single-Cell Chromatin Accessibility Reveals Principles of Regulatory Variation", Nature, vol. 523, No. 7561, 2015, pp. 486-490.
English language abstract and machine-assisted English translation for CN 108300766 A extracted from espacenet.com database on Apr. 25, 2022, 18 pages.
Guo, Fan et al., Single-Cell Multi-Omics Sequencing of Mouse Early Embryos and Embryonic Stem Cells, Cell Research, vol. 27, 2017, pp. 967-988.
Guo, H. et al., "Single-Cell Methylome Landscapes of Mouse Embryonic Stem Cells and Early Embryos Analyzed Using Reduced Representation Bisulfite Sequencing", Genome Res., vol. 23, No. 12, 2013, pp. 2126-2135.
International Search Report for Application No. PCT/CN2019/113387 dated Aug. 5, 2020, 3 pages.
Liu, Yibin et al., "Bisulfate-Free Direct Detection of 5-Methylcytosine and 5-Hydroxymethylcytosine at Base Resolution", Nature Biotechnology Letters, https://doi.org/10.1038/s41587-019-0041-2, 2019, 11 pages.

(Continued)

*Primary Examiner* — Suryaprabha Chunduru
(74) *Attorney, Agent, or Firm* — Howard & Howard Attorneys PLLC

(57) ABSTRACT

The present disclosure provides a method for methylation analysis of genomic fragments.

20 Claims, 8 Drawing Sheets
Specification includes a Sequence Listing.

(56) References Cited

OTHER PUBLICATIONS

Ramani et al., "Massively Multiplex Single-Cell Hi-C", Nature Methods, vol. 14, No. 3, 2017, pp. 263-266.
Smallwood, S.A. et al., "Single-Cell Genome-Wide Bisulfite Sequencing for Assessing Epigenetic Heterogeniety", Nat. Methods, vol. 11, No. 8, 2014, pp. 817-820.
Williams, Louise et al., "Enzymatic Methyl-Seq: Next Generaton Methylomes", New England Biolabs, Inc., www.international.neb.com/tools-and-resources/feature-articles/enzymatic-methyl-seq-the-next-generation-of-meththylome-analysis, 2019, 1 page.
Zahn et al., "Scalable Whole-Genome Single-Cell Library Preparation Without Preamplication", Nature Methods, 2017.
Liu F., et al., "Technologies and applications of single-cell DNA methylation sequencing," Theranostics, Apr. 23, 2023;13(8):2439-2454.

\* cited by examiner

T: Transposase binding site

M: Multiplex priming site

METHYLATION DETECTION AND ANALYSIS OF MAMMALIAN DNA

CROSS-REFERENCE TO RELATED APPLICATIONS

The present application is the National Stage of International Patent Application No. PCT/CN2019/113387 filed Oct. 25, 2019, which is hereby expressly incorporated herein by reference in its entirety.

BACKGROUND

Field of the Invention

Embodiments of the present invention relate in general to methods and compositions for sequencing of DNA in low amount, such as DNA from a few cells to 100 cells or a single cell single cell.

Description of Related Art

The capability to perform high coverage and high precision mammalian DNA methylation studies on single-cell level DNA are essential in studies where cell-to-cell variation and population heterogeneity play a key role, such as tumor growth, stem cell reprogramming, memory formation, embryonic development, etc. This is also important when the cell samples subject to analysis are precious or rare or in minute amounts, such as when the sample is a single cell or the genome, in whole or in part, of a single cell or cell-free DNA.

To analyze DNA methylation at single-base resolution, DNA needs to go through chemical or enzymatic conversion to effectively distinguish methylated cytosine, and unmethylated cytosine. Common conversion methods include but by limited to sodium-bisulfite, TET-assisted-pyridine-borane sequencing (TAPS), Liu et al., Nature Biotechnology (2019). "Bisulfite-free direct detection of 5-methylcytosine and 5-hydroxymethylcytosine at base resolution", Enzymatic-methyl seq conversion (EM-seq), Williams et al., New England Biolabs, Inc. (2019). "Enzymatic Methyl-seq: The Next Generation of Methylome Analysis" [world wide website international.neb.com/tools-and-resources/feature-articles/enzymatic-methyl-seq-the-next-generation-of-methylome-analysis].

The major challenge in all chemical or enzymatic conversion is the loss or damage of DNA that takes place concurrently with the conversion. The conditions necessary for complete conversions, such as long incubation times, elevated temperature, high bisulfite concentration, and high oxidative or reductive environment, can lead to the degradation, DNA base damage and fragmentation of up to 90% of the incubated DNA. DNA purifications between or after steps during the conversion can also lead to DNA loss up to 90%. The extensive DNA loss and damage are problematic and even more so such as when dealing with a limited or low amount of starting DNA or even single-cell level DNA. Low coverage single-cell bisulfite sequencing has been achieved by directly performing bisulfite conversion on a single cell, followed by DNA amplification. Guo, H., eta. (2013). "Single-cell methylome landscapes of mouse embryonic stem cells and early embryos analyzed using reduced representation bisulfite sequencing." Genome Res 23(12): 2126-2135; Smallwood, S. A., et al. (2014). "Single-cell genome-wide bisulfite sequencing for assessing epigenetic heterogeneity." Nat Methods 11(8): 817-820.

The DNA damage during chemical or enzymatic conversion, as well as the DNA loss during DNA purifications that happens concurrently with the conversions, could be significantly reduced by the addition of carrier DNA, such as sonicated lambda DNA size of 100 bp to 4 kb. However, mixing carrier DNA with targeted DNA results in a mixture of samples that could not be later distinguished, causing difficulties or even failure in the following methylation detection and analysis.

In vitro transposition has been used in certain applications of DNA amplification. In such methods, target DNA is simultaneously fragmented and tagged producing fragments tagged with desired DNA sequences for downstream processing. As a library preparation method, in vitro transposition has been utilized in the Nextera technology of Illumina, Inc, to simultaneously fragment DNA and tag each fragment with appropriate sequences for next-generation sequencing (US20110287435). As a tool for studying single-cell genomes and epigenomes, in vitro transposition has been used by Buenrostro et al. to profile chromatin accessibility (Buenrostro, J. D., Wu, B., Litzenburger, U. M., Ruff, D., Gonzales, M. L., Snyder, M. P., . . . & Greenleaf, W. J. (2015). Single-cell chromatin accessibility reveals principles of regulatory variation. Nature, 523(7561), 486-490), by Ramani et al. to study three-dimensional chromosome conformation (Ramani, V., Deng, X., Qiu, R., Gunderson, K. L., Steemers, F. J., Disteche, C. M., . . . & Shendure, J. (2017). Massively multiplex single-cell Hi-C. Nature Methods, 14(3), 263-266), and by Zahn et al. to amplify single-cell genomes directly into sequencing library (Zahn, H., Steif, A., Laks, E., Eirew, P., VanInsberghe, M., Shah, S. P., . . . & Hansen, C. L. (2017). Scalable whole-genome single-cell library preparation without preamplification. Nature Methods, 2017). However, all these methods suffer from approximately 50% loss of the original target nucleic acid. This happens because two transposon sequences are used for tagging, hereafter denoted as A and B: After transposons A and B are tagged to the target DNA, four different types of DNA fragments can be generated, which are fragments tagged with A-A, B-B, A-B or B-A at the two ends of each fragment. Only fragments tagged with A-B or B-A, which account for 50% of the total transposition products, are suitable for PCR amplification or paired-end sequencing. The other 50% of the fragments, which are tagged with A-A or B-B, will be lost. Such a loss rate is certainly undesirable, and potentially unacceptable, for samples with a limited amount of DNA, including rare, unique or valuable single-cell samples, such as a single cell to be used for preimplantation genetic screening. An additional transposition method is described in WO2016/073690, however such method does not reduce the 50% loss resulting from transposition bias.

Accordingly, a need exists for further methods of analyzing methylation status of low amounts of mammalian DNA without incurring loss of DNA associated with prior art methods.

SUMMARY

The present disclosure provides a method for methylation status analysis of a target DNA sample present in a low amount, such as DNA from a plurality of cells or a single cell, including genomic DNA fragmentation using a plurality of transposomes where each member of the plurality of transposomes includes two transposon nucleic acid sequences having priming site sequences. The transposon nucleic acid sequences having priming site sequences that bind to the transposase may be methylated or not methylated for all cytosine depending on whether the conversion chemistry converts methylated cytosine or unmethylated cytosine. The DNA fragment produced by the transposomes may have a cytosine and/or a methyl cytosine present therein.

Methods of fragmenting low volume DNA using transposomes, gap filling, purification, amplification and sequencing are provided in PCT/US2018/034162 hereby incorporated by reference in its entirety and are generally referred to as Multiple End Tagging Amplification or "META". According to one aspect, the priming site sequence of each transposon nucleic acid sequence of the transposome is the same. According to one aspect, the priming site sequence of each transposon nucleic acid sequence of the transposome is different. According to one aspect, each member of the plurality of transposomes may include a unique and/or different priming site sequence. According to one aspect, each member of the plurality of transposomes may include two unique and/or different priming site sequences, one for each transposon in the transposome. In this manner, a set of transposomes are provided having a unique primer binding site sequence (or two unique and/or different priming site sequences) associated therewith and which can be used to distinguish transposomes. Stated, differently, the primer binding site sequences of the transposons within the transposome may be the same or may be different or nonidentical. The primer binding site sequences of the transposomes in two adjacent transposomes attached to a target nucleic acid sequence and used to make a fragment are nonidentical, such as with a high probability. The transposons may be referred to as multiplex transposons to the extent that each transposon within a transposome has a different priming site sequence. The priming sites within a library of transposomes may be referred to as multiplex priming sites to the extent that each transposome has a priming site that is different or nonidentical or unique from other priming sites within other transposomes within the set of transposomes. According to one aspect, the method provides the step of binding transposomes from a library or plurality of transposomes along a target nucleic acid sequence such that adjacent transposomes have different primer binding site sequences. In this manner, the ends of the fragmentation site will be tagged with different primer binding site sequences. This can be accomplished whether a transposome has the same primer binding site sequence for each of its two transposon DNA or whether a transposome has different primer binding site sequence for each of its two transposon DNA. In this manner, the multiplex end-tagging amplification method described herein uses multiple priming sequences to create target DNA fragments tagged by different sequences at the two ends. The multiplex end-tagging amplification method can be carried out whether the two transposon sequences within a transposome are the same or are different, as long as two adjacent transposome, i.e., directly adjacent so as to form a fragment sequence, carry different transposon primer binding site sequences where the fragment has different primer binding site sequences at each end.

According to one aspect, the use of multiplex priming site sequences within a set of transposomes reduced loss rate when a transposition method is used to fragment and tag a genomic nucleic acid sequence, such as a genomic nucleic acid sequence of a single cell. According to the teachings herein, when there are N different transposon sequences in the reaction mixture, i.e. when the number of unique priming site sequences is N, the chance of a DNA fragment tagged by the same transposon sequence, namely the loss rate, is 1/N. The present disclosure, therefore, provides a method for altering the number of unique priming site sequences, i.e. the number N, to control the loss rate. For example, when there are 20 different transposon sequences, for use with DNA obtained from a human single cell, the loss rate is 1/20 or 5%.

The method described herein creating a plurality of fragments uses a set of transposomes where each member of the set of transposomes has one or two different primer binding site sequences and where each member of the set of transposomes has one or two unique or different priming binding sites compared to each other member of the set of transposomes, such as with a high probability. In this manner, adjoining ends of fragments are barcoded with different and/or unique end barcode sequences during the fragmentation process to create fragments having unique barcode sequences (priming site sequences) on each end. In this manner, opposite ends of fragments are barcoded with different and/or unique end barcode sequences with a high probability during the fragmentation process to create fragments having different barcode sequences (priming site sequences) on each end. In this manner, the two opposite ends of fragments are barcoded with different and/or unique end barcode sequences during the fragmentation process to create fragments having unique barcode sequences (priming site sequences) on each end.

According to one aspect, a transposome library is used to make fragments of genomic DNA in aqueous media where a unique barcode sequence is inserted or attached to each end of the genomic DNA at a site which has been cut by the transposase of the transposome. Since each transposome has one or two different and/or unique priming site sequences compared to other transposome members of the set or plurality or library, each fragment will have unique priming site sequences (barcode sequences) on each end. According to one aspect, each fragment will include one or more cytosine or one or more methylcytosine. The methods described herein utilize carrier DNA during a chemical conversion step that converts cytosine to uracil to protect the sample DNA from being lost or damaged during the chemical conversion step. Reagents or enzymes used to convert cytosine to uracil are known to those of skill in the art. Enzymatic reagents to convert cytosine to uracil, i.e. cytosine deaminases, include those of the APOBEC family, such as APOBEC-seq or APOBEC3A. The APOBEC family members are cytidine deaminases that convert cytosine to uracil while maintaining 5-hydroxymethyl cytosine, i.e. without altering 5-hydroxymethyl cytosine. 5-methyl cytosine may be converted to 5-hydroxymethyl cytosine by oxidation reaction with TET enzyme. Such enzymes are described in US 2013/0244237 and may be available from New England Biolabs. Other enzymatic reagents will become apparent to those of skill in the art based on the present disclosure. According to one aspect, the reagent is not bisulfite or excludes bisulfite or the reagent converts cytosine to uracil with the proviso that the reagent is not bisulfite. The carrier DNA can then be removed or the converted fragments can be amplified without also amplifying the carrier DNA resulting in amplified fragmented DNA. More specifically, methods are provided using primers or adapters inserted into fragmented target DNA using a transposome method and the addition of carrier DNA to reduce DNA loss and DNA damage during the chemical or enzymatic conversion of DNA, which is required for base resolution methylation analysis. The use of transposomes to create fragments with primers or adapters at each end as described herein (and before the addition of carrier DNA) adds barcode and PCR adapters to targeted DNA such that targeted DNA could be sufficiently distinguished from carrier DNA. According to methods described herein, adapter-ligated DNA is amplified while carrier DNA is not amplified. Carrier DNA becomes single stranded DNA, i.e. ssDNA, and is removed from the mixture, resulting in pure amplified targeted DNA.

The present disclosure contemplates fragmenting genomic DNA into a plurality of fragments, such as 5 or more fragments, 10 or more fragments, 100 or more fragments, 1000 or more fragments, 10,000 or more fragments, 100,000 or more fragments, 1,000,000 or more fragments, or 10,000,000 or more fragments using a transposome library as described herein. According to one aspect depending on the number of unique and/or different primer binding site sequences, a transposome library includes 5 to 10 types or kinds of transposome members, 10 to 100 types or kinds of transposome members, 100 or more types or kinds of transposome members, 1000 or more types or kinds of transposome members, 10,000 or more types or kinds of transposome members, 100,000 or more types or kinds of transposome members, 1,000,000 or more types or kinds of transposome members, or 10,000,000 or more types or kinds of transposome members or between 5 and 50 types or kinds of transposome members.

According to one aspect, each transposome includes two transposases and two transposon DNA. Each of the two transposon DNA of the transposome includes a transposase binding site and a primer binding site sequence. According to one aspect, the transposon DNA includes a single transposase binding site and a unique primer binding site sequence. Each transposon DNA is a separate nucleic acid bound to a transposase at the transposase binding site. The transposome is a dimer of two separate transposases each bound to its own transposon DNA. The dimer may have the same primer binding site sequences on each transposon or may have different primer binding site sequences on each transposon. According to one aspect, the transposome includes two separate and individual transposon DNA, each bound to its own corresponding transposase. According to one aspect, the transposome includes only two transposases and only two transposon DNA. According to one aspect, the two transposon DNA as part of the transposome are separate, individual or non-linked transposon DNA, each bound to its own corresponding transposase.

According to one aspect, each transposome member of the library includes a unique and different priming site sequence. The same unique and different priming site sequence may be present on each transposon DNA of the transposome or a different unique and different priming site sequence may be present on each transposon DNA of the transposome. In this manner, each transposome includes a unique and different priming site sequence that is unique and different from the priming site sequences of any other transposome in the transposome library. According to one aspect, the transposome library may include transposome members that have the same priming site sequences as other transposome members, although the probability is relatively small or insignificant. In this manner, the transposome library may be considered to be a subset of the prepared collection of transposomes, where the subset includes only transposomes with a unique and different priming site sequence, as the objective is to fragment genomic DNA where each fragment cut site has different priming site sequences. It is to be understood that the objective of fragmenting genomic DNA where each fragment cut site has a different priming site sequence may be accomplished where adjacent transposomes each have a unique and different priming site sequence, though it may be shared by the two transposons of the transposome. It is to be understood that the objective of fragmenting genomic DNA where each fragment cut site has a different priming site sequence may be accomplished where adjacent transposomes each have two unique and different priming site sequences, where each transposon of the transposome has a unique and different priming site sequences.

It is to be understood that an insignificant number of cut sites may share the same priming site sequence due to transposome library preparation. For example, for a given library preparation method, it is mathematically possible that multiple molecules of transposome with the same priming site sequence exist, but the library is prepared such that the number of different priming site sequences significantly exceeds the number of transposome molecules that will actually be inserted into the target genome. According to one aspect, the transposome library may include transposome members that have the same two priming site sequences, ie., the priming site sequences are identical or the same, although this priming site sequence is unique compared to any other transposon DNA of tranposome members of the transposome library. To make such a transposome library, each transposome member is made separately by mixing transposase and the transposon DNA which contain the unique priming site sequence. All the transpome members are then be mixed together to form the transposome library.

According to one aspect, a transposome library is prepared by mixing all transposon sequences together with transposase to form transposome. In this method, most transposomes have different transposon sequences, but the chance of a transposome carrying the same transposon sequences is 1/N. According to another method of making a transposome library, each type of transposon sequence is mixed with transposase separately, and then all the tranposome are mixed to form the transposome library. In this method, all the tranposomes will have same transposon sequences.

According to one aspect, the number of unique and/or different priming site sequences is between 5 and 50, 10 and 50, 15 and 45, 20 and 40 or between 1 and 1,000, 1 and 10,000, 1 and 100,000, 1 and 1,000,000 or 1 and 10,000,000. According to one aspect, the number of cut sites in the genomic DNA is determined or tuned by the concentration of transposomes, with the higher concentration resulting in a higher number of cut sites and a lower concentration resulting in a lower number of cut sites. According to one aspect, the number of transposomes and associated different and/or unique priming site sequences is selected such that substantially all of the cut sites have two different and/or unique priming site sequences. According to one aspect, more than 90% of the cut sites have two different and/or unique priming site sequences, more than 95% of the cut sites have two different and/or unique priming site sequences, 96% of the cut sites have two different and/or unique priming site sequences, 97% of the cut sites have two different and/or unique priming site sequences, 98% of the cut sites have two different an/or unique priming site sequences, 99% of the cut sites have two different and/or unique priming site sequences, 99.5% of the cut sites have two different and/or unique priming site sequences, or 100% of the cut sites have two different and/or unique priming site sequences.

The transposome library is then used to cut the genomic DNA and each transposome inserts or attaches its priming site sequences in each of the transposon DNA at the ends of the cut site. Where adjacent transposomes have unique and different priming site sequences compared to each other, the cut site will have a unique and different priming site sequence at each end of the site, i.e. the priming site sequences inserted will be different. In this manner, a plurality or most or substantially all fragments produced by the transposome library have a different and/or unique priming site sequence on each end, i.e. opposite ends, of the fragment, insofar as adjacent transposomes have unique and different priming site sequences compared to each other. The transposase can then be removed from each fragment followed by a gap fill-in step, by for example, a polymerase extension step. The resulting double stranded nucleic acid fragment sequence can then be amplified, for example using multiplex PCR amplification. The fragments can then be sequenced and the sequence of the genomic DNA can be determined.

According to one aspect, the transposon DNA of the transposome can include sequences facilitating amplification methods, such as specific primer sequences or transcription promoter sequences which can be attached to the fragments so that the fragments can be amplified prior to sequencing, such as by PCR or RNA transcription using methods known to those of skill in the art. It is to be understood that the present disclosure contemplates different amplification methods for amplifying the fragments and different sequencing methods for sequencing the amplicons are not limited to any particular amplification or sequencing method.

Embodiments of the present disclosure are directed to a method of multiplex end-tagging amplification of nucleic acids, such as genomic DNA, such as a low or small amount of genomic DNA or a limited amount of DNA such as a genomic sequence or genomic sequences obtained from a single cell or a plurality of cells of the same cell type or from a tissue, fluid or blood sample obtained from an individual or a substrate. According to certain aspects of the present disclosure, the methods described herein can be performed in a single tube with a single reaction mixture. According to certain aspects of the present disclosure, the nucleic acid sample can be within an unpurified or unprocessed lysate from a single cell. Nucleic acids to be subjected to the methods disclosed herein need not be purified, such as by column purification, prior to being contacted with the various reagents and under the various conditions as described herein. The methods described herein reduce the loss rate, i.e., loss of the original target nucleic acid so as to assist in providing substantial and uniform coverage of the entire genome of a single cell producing amplified DNA for high-throughput sequencing.

Embodiments of the present invention relate in general to methods and compositions for making DNA fragments, for example, DNA fragments from the whole genome of a single cell which may then be subjected to amplification and sequencing methods known to those of skill in the art and as described herein. According to certain aspects, methods of making nucleic acid fragments described herein utilize a transposome library. According to one aspect, a transposase as part of a transposome is used to create a set of double stranded genomic DNA fragments. According to certain aspects, the transposases have the capability to bind to transposon DNA and dimerize when contacted together, such as when being placed within a reaction vessel or reaction volume, forming a transposase/transposon DNA complex dimer called a transposome. Each transposon DNA of the transposome includes a double stranded transposase binding site and a first nucleic acid sequence including a priming site sequence and optionally functional sequences such as a transcription promoter site. The first nucleic acid sequence may be in the form of a single stranded extension. Each transposome of the transposome library includes a unique and different priming site sequence that are different from the priming site sequences of each remaining member of the transposome library. According to one aspect, each transposome of the transposome library includes two unique and different priming site sequence that are different from the priming site sequences of each remaining member of the transposome library.

The transposomes have the capability to randomly bind to target locations along double stranded nucleic acids, such as double stranded genomic DNA, forming a complex including the transposome and the double stranded genomic DNA. The transposases in the transposome cleave the double stranded genomic DNA, with one transposase cleaving the upper strand and one transposase cleaving the lower strand. Each of the transposon DNA in the transposome is attached to the double stranded genomic DNA at each end of the cut site, i.e. one transposon DNA of the transposome is attached to the left hand cut site and the other transposon DNA of the transposome is attached to the right hand cut site. When the transposon DNA of the transposome each have different primer binding site sequences, the left hand cut site and the right hand cut site are "barcoded" with a different and unique barcode, i.e. priming site, sequences. When the transposon DNA of the transposome each have the same primer binding site sequence, the left hand cut site and the right hand cut site are "barcoded" with the same barcode, i.e. priming site, sequence. When adjacent transposomes used to make a fragment each have a different and unique primer binding site sequence, the resulting fragment will have a different and unique primer binding site on each end of the fragment. According to certain aspects, a plurality of transposase/transposon DNA complex dimers, i.e. transposomes, bind to a corresponding plurality of target locations along a double stranded genomic DNA, for example, and then cleave the double stranded genomic DNA into a plurality of double stranded fragments with each fragment having transposon DNA with a different barcode sequence attached at each end of the double stranded fragment.

According to one aspect, the transposon DNA is attached to the double stranded genomic DNA and a single stranded gap exists between one strand of the genomic DNA and one strand of the transposon DNA. According to one aspect, gap extension is carried out to fill the gap and create a double stranded connection between the double stranded genomic DNA and the double stranded transposon DNA. According to one aspect, a nucleic acid sequence including the transposase binding site and the priming site sequence is attached at each end of the double stranded fragment. According to certain aspects, the transposase is attached to the transposon DNA which is attached at each end of the double stranded fragment. According to one aspect, the transposases are removed from the transposon DNA which is attached at each end of the double stranded genomic DNA fragments.

According to one aspect of the present disclosure, the double stranded genomic DNA fragments which have the transposon DNA with different priming site sequences attached at each end of the double stranded genomic DNA fragments are then gap filled and extended using the transposon DNA as a template. Accordingly, a double stranded nucleic acid extension product is produced which includes the double stranded genomic DNA fragment and a double stranded transposon DNA including a different priming site sequence at each end of the double stranded genomic DNA.

At this stage, the double stranded nucleic acid extension products including the genomic DNA fragment, the different priming site sequences at each end can be amplified using methods known to those of skill in the art to produce amplicons of the genomic DNA fragment and the different primer binding site at each end. PCR primer sequences and reagents can be used for amplification. The transposons as described herein may also include an RNA polymerase binding site for production of RNA transcripts which may then be reverse transcribed into cDNA for linear amplification. The double stranded nucleic acid extension products including the genomic DNA fragment and the different priming site sequences at each end can be combined with amplification reagents and the double stranded genomic nucleic acid fragment may then be amplified using methods known to those of skill in the art to produce amplicons of the double stranded genomic nucleic acid fragment.

The amplicons can then be collected and/or purified prior to further analysis. The amplicons can be sequenced using methods known to those of skill in the art. Once sequenced, the sequences can be computationally analyzed to identify the genomic DNA.

Embodiments of the present disclosure are directed to a method of amplifying DNA using multiplex end-tagging, wherein the DNA is a low or small amount of genomic DNA or a limited amount of DNA such as a genomic sequence or genomic sequences obtained from a single cell or a plurality of cells of the same cell type or from a tissue, fluid or blood sample obtained from an individual or a substrate. According to certain aspects of the present disclosure, the methods described herein can be performed in a single tube to create the fragments having different and unique sequences at each end which are then amplified and sequenced using high throughput sequencing platforms known to those of skill in the art.

The transposome fragmentation and barcoding method described herein is useful for amplifying and then sequencing of low or small or limited amounts of DNA. Methods described herein have particular application in biological systems or tissue samples characterized by highly heterogeneous cell populations such as tumor and neural masses. The methods described herein can utilize varied sources of DNA materials, including genetically heterogeneous tissues (e.g. cancers), rare and precious samples (e.g. embryonic stem cells), and non-dividing cells (e.g. neurons) and the like, as well as, sequencing platforms and genotyping methods known to those of skill in the art.

Further features and advantages of certain embodiments of the present disclosure will become more fully apparent in the following description of the embodiments and drawings thereof, and from the claims.

BRIEF DESCRIPTION OF THE DRAWINGS

The foregoing and other features and advantages of the present invention will be more fully understood from the following detailed description of illustrative embodiments taken in conjunction with the accompanying drawings in which.

DETAILED DESCRIPTION

Figure 1:
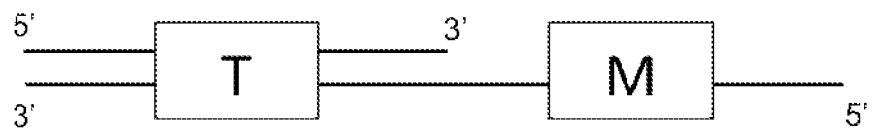
FIG. 1 depicts in schematic a structure of a transposon DNA with a 5' extension being linear, where T is the double stranded transposase binding site, and M is a multiplex priming site at one end of the extension.

According to one aspect, a method of single cell whole genome amplification, sequencing and assembly is provided which includes contacting double stranded genomic DNA from a single cell with transposases, such as Tn5 transposases, each bound to a transposon DNA, wherein the transposon DNA includes a double-stranded 19 bp transposase (Tnp) binding site and a first nucleic acid sequence including a unique and different priming site sequence to form a transposase/transposon DNA complex dimer called a transposome. The first nucleic acid sequence may be in the form of a single stranded extension. According to one aspect, the first nucleic acid sequence may be an overhang, such as a 5' overhang, wherein the overhang includes a unique and different priming site sequence. The overhang may include other functional sequences as desired. The overhang can be of any length suitable to include a priming site sequence, or other functional sequences as desired. The transposome bind to target locations along the double stranded genomic DNA and cleave the double stranded genomic DNA into a plurality of double stranded fragments, with each double stranded fragment having a first complex attached to an upper strand by the Tnp binding site and a second complex attached to a lower strand by the Tnp binding site. The transposon binding site, and therefore the transposon DNA along with the primer binding site, is attached to each 5' end of the double stranded fragment. According to one aspect, the Tn5 transposases are removed from the complex.

The double stranded fragments include one or more cytosine or one or more methylcytosine and are extended along the transposon DNA to make a double stranded extension product having dissimilar or different or unique priming site sequences at each end of the double stranded extension product. According to one aspect, a gap which may result from attachment of the Tn5 transposase binding site to the double stranded genomic DNA fragment may be filled.

The gap filled double stranded extension product is then subjected to chemical treatment in the presence of carrier DNA to convert cytosine to uracil.

The gap filled double stranded extension product is mixed with amplification reagents, and the double stranded genomic DNA fragment is amplified. The amplicons, which include a dissimilar or different or unique priming site sequence (which may function as a barcode sequence) at each end, are sequenced using, for example, high-throughput sequencing methods known to those of skill in the art.

In a particular aspect, embodiments are directed to methods for the amplification, sequencing and assembly of substantially the entire genome without loss of representation of specific sites (herein defined as "whole genome amplification"). In a specific embodiment, whole genome amplification comprises amplification of substantially all fragments or all fragments of a genomic library. In a further specific embodiment, "substantially entire" or "substantially all" refers to about 80%, about 85%, about 90%, about 95%, about 97%, or about 99% of all sequences in a genome.

The practice of certain embodiments or features of certain embodiments may employ, unless otherwise indicated, conventional techniques of molecular biology, microbiology, recombinant DNA, and so forth which are within ordinary skill in the art. Such techniques are explained fully in the literature. See e.g., Sambrook, Fritsch, and Maniatis, MOLECULAR CLONING: A LABORATORY MANUAL, Second Edition (1989), OLIGONUCLEOTIDE SYNTHESIS (M. J. Gait Ed., 1984), ANIMAL CELL CULTURE (R. I. Freshney, Ed., 1987), the series METHODS IN ENZYMOLOGY (Academic Press, Inc.); GENE TRANSFER VECTORS FOR MAMMALIAN CELLS (J. M. Miller and M. P. Calos eds. 1987), HANDBOOK OF EXPERIMENTAL IMMUNOLOGY, (D. M. Weir and C. C. Blackwell, Eds.), CURRENT PROTOCOLS IN MOLECULAR BIOLOGY (F. M. Ausubel, R. Brent, R. E. Kingston, D. D. Moore, J. G. Siedman, J. A. Smith, and K. Struhl, eds., 1987), CURRENT PROTOCOLS IN IMMUNOLOGY (J. E. Coligan, A. M. Kruisbeek, D. H. Margulies, E. M. Shevach and W. Strober, eds., 1991); ANNUAL REVIEW OF IMMUNOLOGY; as well as monographs in journals such as ADVANCES IN IMMUNOLOGY. All patents, patent applications, and publications mentioned herein, both supra and infra, are hereby incorporated herein by reference.

Terms and symbols of nucleic acid chemistry, biochemistry, genetics, and molecular biology used herein follow those of standard treatises and texts in the field, e.g., Kornberg and Baker, *DNA Replication*, Second Edition (W.H. Freeman, New York, 1992); Lehninger, Biochemistry, Second Edition (Worth Publishers, New York, 1975); Strachan and Read, *Human Molecular Genetics*, Second Edition (Wiley-Liss, New York, 1999); Eckstein, editor, *Oligonucleotides and Analogs: A Practical Approach* (Oxford University Press, New York, 1991); Gait, editor, *Oligonucleotide Synthesis: A Practical Approach* (IRL Press, Oxford, 1984); and the like.

Definitions

As used herein, the term "biological sample" is intended to include, but is not limited to, tissues, cells, biological fluids and isolates thereof, isolated from a subject, as well as tissues, cells and fluids present within a subject.

The term "in vitro" has its art recognized meaning, e.g., involving purified reagents or extracts, e.g., cell extracts. The term "in vivo" also has its art recognized meaning, e.g., involving living cells, e.g., immortalized cells, primary cells, cell lines, and/or cells in an organism.

As used herein, the terms "complementary" and "complementarity" are used in reference to nucleotide sequences related by the base-pairing rules. For example, the sequence 5'-AGT-3' is complementary to the sequence 5'-ACT-3'. Complementarity can be partial or total. Partial complementarity occurs when one or more nucleic acid bases is not matched according to the base pairing rules. Total or complete complementarity between nucleic acids occurs when each and every nucleic acid base is matched with another base under the base pairing rules. The degree of complementarity between nucleic acid strands has significant effects on the efficiency and strength of hybridization between nucleic acid strands.

The term "hybridization" refers to the pairing of complementary nucleic acids. Hybridization and the strength of hybridization (i.e., the strength of the association between the nucleic acids) is impacted by such factors as the degree of complementary between the nucleic acids, stringency of the conditions involved, the $T_m$ of the formed hybrid, and the G:C ratio within the nucleic acids. A single molecule that contains pairing of complementary nucleic acids within its structure is said to be "self-hybridized."

The term "$T_m$" refers to the melting temperature of a nucleic acid. The melting temperature is the temperature at which a population of double-stranded nucleic acid molecules becomes half dissociated into single strands. The equation for calculating the $T_m$ of nucleic acids is well known in the art. As indicated by standard references, a simple estimate of the $T_m$ value may be calculated by the equation: $T_m=81.5+0.41$ (% G+C), when a nucleic acid is in aqueous solution at 1 M NaCl (See, e.g., Anderson and Young, Quantitative Filter Hybridization, in *Nucleic Acid Hybridization* (1985)). Other references include more sophisticated computations that take structural as well as sequence characteristics into account for the calculation of $T_m$.

The term "stringency" refers to the conditions of temperature, ionic strength, and the presence of other compounds such as organic solvents, under which nucleic acid hybridizations are conducted.

"Low stringency conditions," when used in reference to nucleic acid hybridization, comprise conditions equivalent to binding or hybridization at 42° C. in a solution consisting of 5×SSPE (43.8 g/l NaCl, 6.9 g/l NaH$_2$PO$_4$(H$_2$O) and 1.85 g/l EDTA, pH adjusted to 7.4 with NaOH), 0.1% SDS, 5×Denhardt's reagent (50×Denhardt's contains per 500 ml: 5 g Ficoll (Type 400, Pharmacia), 5 g BSA (Fraction V; Sigma)) and 100 mg/ml denatured salmon sperm DNA followed by washing in a solution comprising 5×SSPE, 0.1% SDS at 42° C. when a probe of about 500 nucleotides in length is employed.

"Medium stringency conditions," when used in reference to nucleic acid hybridization, comprise conditions equivalent to binding or hybridization at 42° C. in a solution consisting of 5×SSPE (43.8 g/l NaCl, 6.9 g/l NaH$_2$PO$_4$ (H$_2$O) and 1.85 g/l EDTA, pH adjusted to 7.4 with NaOH), 0.5% SDS, 5×Denhardt's reagent and 100 mg/ml denatured salmon sperm DNA followed by washing in a solution comprising 1.0×SSPE, 1.0% SDS at 42° C. when a probe of about 500 nucleotides in length is employed.

"High stringency conditions," when used in reference to nucleic acid hybridization, comprise conditions equivalent to binding or hybridization at 42° C. in a solution consisting of 5×SSPE (43.8 g/l NaCl, 6.9 g/l NaH$_2$PO$_4$(H$_2$O) and 1.85 g/l EDTA, pH adjusted to 7.4 with NaOH), 0.5% SDS, 5×Denhardt's reagent and 100 mg/ml denatured salmon sperm DNA followed by washing in a solution comprising 0.1×SSPE, 1.0% SDS at 42° C. when a probe of about 500 nucleotides in length is employed.

The term "genome" as used herein is defined as the collective gene set carried by an individual, cell, or organelle. The term "genomic DNA" as used herein is defined as DNA material comprising the partial or full collective gene set carried by an individual, cell, or organelle.

As used herein, the term "nucleoside" refers to a molecule having a purine or pyrimidine base covalently linked to a ribose or deoxyribose sugar. Exemplary nucleosides include adenosine, guanosine, cytidine, uridine and thymidine. Additional exemplary nucleosides include inosine, 1-methyl inosine, pseudouridine, 5,6-dihydrouridine, ribothymidine, 2N-methylguanosine and 2,2N,N-dimethylguanosine (also referred to as "rare" nucleosides). The term "nucleotide" refers to a nucleoside having one or more phosphate groups joined in ester linkages to the sugar moiety. Exemplary nucleotides include nucleoside monophosphates, diphosphates and triphosphates. The terms "polynucleotide," "oligonucleotide" and "nucleic acid molecule" are used interchangeably herein and refer to a polymer of nucleotides, either deoxyribonucleotides or ribonucleotides, of any length joined together by a phosphodiester linkage between 5' and 3' carbon atoms. Polynucleotides can have any three-dimensional structure and can perform any function, known or unknown. The following are non-limiting examples of polynucleotides: a gene or gene fragment (for example, a probe, primer, EST or SAGE tag), exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes and primers. A polynucleotide can comprise modified nucleotides, such as methylated nucleotides and nucleotide analogs. The term also refers to both double- and single-stranded molecules. Unless otherwise specified or required, any embodiment of this invention that comprises a polynucleotide encompasses both the double-stranded form and each of two complementary single-stranded forms known or predicted to make up the double-stranded form. A polynucleotide is composed of a specific sequence of four nucleotide bases: adenine (A); cytosine (C); guanine (G); thymine (T); and uracil (U) for thymine when the polynucleotide is RNA. Thus, the term polynucleotide sequence is the alphabetical representation of a polynucleotide molecule. This alphabetical representation can be input into databases in a computer having a central processing unit and used for bioinformatics applications such as functional genomics and homology searching.

The terms "DNA," "DNA molecule" and "deoxyribonucleic acid molecule" refer to a polymer of deoxyribonucleotides. DNA can be synthesized naturally (e.g., by DNA replication). RNA can be post-transcriptionally modified. DNA can also be chemically synthesized. DNA can be single-stranded (i.e., ssDNA) or multi-stranded (e.g., double stranded, i.e., dsDNA).

The terms "nucleotide analog," "altered nucleotide" and "modified nucleotide" refer to a non-standard nucleotide, including non-naturally occurring ribonucleotides or deoxyribonucleotides. In certain exemplary embodiments, nucleotide analogs are modified at any position so as to alter certain chemical properties of the nucleotide yet retain the ability of the nucleotide analog to perform its intended function. Examples of positions of the nucleotide which may be derivitized include the 5 position, e.g., 5-(2-amino) propyl uridine, 5-bromo uridine, 5-propyne uridine, 5-propenyl uridine, etc.; the 6 position, e.g., 6-(2-amino) propyl uridine; the 8-position for adenosine and/or guanosines, e.g., 8-bromo guanosine, 8-chloro guanosine, 8-fluoroguanosine, etc. Nucleotide analogs also include deaza nucleotides, e.g., 7-deaza-adenosine; O- and N-modified (e.g., alkylated, e.g., N6-methyl adenosine, or as otherwise known in the art) nucleotides; and other heterocyclically modified nucleotide analogs such as those described in Herdewijn, Antisense Nucleic Acid Drug Dev., 2000 Aug. 10(4): 297-310.

Nucleotide analogs may also comprise modifications to the sugar portion of the nucleotides. For example the 2' OH-group may be replaced by a group selected from H, OR, R, F, Cl, Br, I, SH, SR, NH$_2$, NHR, NR$_2$, COOR, or OR, wherein R is substituted or unsubstituted C$_1$-C$_6$ alkyl, alkenyl, alkynyl, aryl, etc. Other possible modifications include those described in U.S. Pat. Nos. 5,858,988, and 6,291,438.

The phosphate group of the nucleotide may also be modified, e.g., by substituting one or more of the oxygens of the phosphate group with sulfur (e.g., phosphorothioates), or by making other substitutions which allow the nucleotide to perform its intended function such as described in, for example, Eckstein, Antisense Nucleic Acid Drug Dev. 2000 Apr. 10(2): 117-21, Rusckowski et al. Antisense Nucleic Acid Drug Dev. 2000 Oct. 10(5): 333-45, Stein, Antisense Nucleic Acid Drug Dev. 2001 Oct. 11(5): 317-25, Vorobjev et al. Antisense Nucleic Acid Drug Dev. 2001 Apr. 11(2): 77-85, and U.S. Pat. No. 5,684,143. Certain of the above-referenced modifications (e.g., phosphate group modifications) decrease the rate of hydrolysis of, for example, polynucleotides comprising said analogs in vivo or in vitro.

Obtaining DNA Samples

Nucleic acids processed by methods described herein may be DNA and they may be obtained from any useful source, such as, for example, a human sample. In specific embodiments, a double stranded DNA molecule is further defined as comprising a genome, such as, for example, one obtained from a sample from a human. The sample may be any sample from a human, such as blood, serum, plasma, cerebrospinal fluid, cheek scrapings, nipple aspirate, biopsy, semen (which may be referred to as ejaculate), urine, feces, hair follicle, saliva, sweat, immunoprecipitated or physically isolated chromatin, and so forth. In specific embodiments, the sample comprises a single cell. In specific embodiments, the sample includes only a single cell.

According to one aspect, the DNA sample is genomic DNA, micro dissected chromosome DNA, yeast artificial chromosome (YAC) DNA, plasmid DNA, cosmid DNA, phage DNA, P1 derived artificial chromosome (PAC) DNA, or bacterial artificial chromosome (BAC) DNA, mitochondrial DNA, chloroplast DNA, forensic sample DNA, or other DNA from natural or artificial sources to be tested. In another preferred embodiment, the DNA sample is mammalian DNA, plant DNA, yeast DNA, viral DNA, or prokaryotic DNA. In yet another preferred embodiment, the DNA sample is obtained from a human, bovine, porcine, ovine, equine, rodent, avian, fish, shrimp, plant, yeast, virus, or bacteria. Preferably the DNA sample is genomic DNA.

In certain exemplary embodiments, cells are identified and then a single cell or a plurality of cells is isolated. Cells within the scope of the present disclosure include any type of cell where understanding the DNA content is considered by those of skill in the art to be useful. A cell according to the present disclosure includes a cancer cell of any type, hepatocyte, oocyte, embryo, stem cell, iPS cell, ES cell, neuron, erythrocyte, melanocyte, astrocyte, germ cell, oligodendrocyte, kidney cell and the like. According to one aspect, the methods of the present invention are practiced with the cellular DNA from a single cell. A plurality of cells includes from about 2 to about 1,000,000 cells, about 2 to about 10 cells, about 2 to about 100 cells, about 2 to about 1,000 cells, about 2 to about 10,000 cells, about 2 to about 100,000 cells, about 2 to about 10 cells or about 2 to about 5 cells.

As used herein, a "single cell" refers to one cell. Single cells useful in the methods described herein can be obtained from a tissue of interest, or from a biopsy, blood sample, or cell culture. Additionally, cells from specific organs, tissues, tumors, neoplasms, or the like can be obtained and used in the methods described herein. Furthermore, in general, cells from any population can be used in the methods, such as a population of prokaryotic or eukaryotic single celled organisms including bacteria or yeast. A single cell suspension can be obtained using standard methods known in the art including, for example, enzymatically using trypsin or papain to digest proteins connecting cells in tissue samples or releasing adherent cells in culture, or mechanically separating cells in a sample. Single cells can be placed in any suitable reaction vessel in which single cells can be treated individually. For example a 96-well plate, such that each single cell is placed in a single well.

Methods for manipulating single cells are known in the art and include fluorescence activated cell sorting (FACS), flow cytometry (Herzenberg., *PNAS USA* 76:1453-55 1979), micromanipulation and the use of semi-automated cell pickers (e.g. the Quixell™ cell transfer system from Stoelting Co.). Individual cells can, for example, be individually selected based on features detectable by microscopic observation, such as location, morphology, or reporter gene expression. Additionally, a combination of gradient centrifugation and flow cytometry can also be used to increase isolation or sorting efficiency.

Once a desired cell has been identified, the cell is lysed to release cellular contents including DNA, using methods known to those of skill in the art. The cellular contents are contained within a vessel or a collection volume. In some aspects of the invention, cellular contents, such as genomic DNA, can be released from the cells by lysing the cells. Lysis can be achieved by, for example, heating the cells, or by the use of detergents or other chemical methods, or by a combination of these. However, any suitable lysis method known in the art can be used. For example, heating the cells at 72° C. for 2 minutes in the presence of Tween-20 is sufficient to lyse the cells. Alternatively, cells can be heated to 65° C. for 10 minutes in water (Esumi et al., *Neurosci Res* 60(4): 439-51 (2008)); or 70° C. for 90 seconds in PCR buffer II (Applied Biosystems) supplemented with 0.5% NP-40 (Kurimoto et al., *Nucleic Acids Res* 34(5):e42 (2006)); or lysis can be achieved with a protease such as Proteinase K or by the use of chaotropic salts such as guanidine isothiocyanate (U.S. Publication No. 2007/0281313). Amplification of genomic DNA according to methods described herein can be performed directly on cell lysates, such that a reaction mix can be added to the cell lysates. Alternatively, the cell lysate can be separated into two or more volumes such as into two or more containers, tubes or regions using methods known to those of skill in the art with a portion of the cell lysate contained in each volume container, tube or region. Genomic DNA contained in each container, tube or region may then be amplified by methods described herein or methods known to those of skill in the art.

A nucleic acid used in the invention can also include native or non-native bases. In this regard a native deoxyribonucleic acid can have one or more bases selected from the group consisting of adenine, thymine, cytosine or guanine and a ribonucleic acid can have one or more bases selected from the group consisting of uracil, adenine, cytosine or guanine. Exemplary non-native bases that can be included in a nucleic acid, whether having a native backbone or analog structure, include, without limitation, inosine, xathanine, hypoxathanine, isocytosine, isoguanine, 5-methylcytosine, 5-hydroxymethyl cytosine, 2-aminoadenine, 6-methyl adenine, 6-methyl guanine, 2-propyl guanine, 2-propyl adenine, 2-thioLiracil, 2-thiothymine, 2-thiocytosine, 15-halouracil, 15-halocytosine, 5-propynyl uracil, 5-propynyl cytosine, 6-azo uracil, 6-azo cytosine, 6-azo thymine, 5-uracil, 4-thiouracil, 8-halo adenine or guanine, 8-amino adenine or guanine, 8-thiol adenine or guanine, 8-thioalkyl adenine or guanine, 8-hydroxyl adenine or guanine, 5-halo substituted uracil or cytosine, 7-methylguanine, 7-methyladenine, 8-azaguanine, 8-azaadenine, 7-deazaguanine, 7-deazaadenine, 3-deazaguanine, 3-deazaadenine or the like. A particular embodiment can utilize isocytosine and isoguanine in a nucleic acid in order to reduce non-specific hybridization, as generally described in U.S. Pat. No. 5,681,702.

Use of Transposomes to Generate Fragments

The present invention is based in part on methods for making nucleic acid fragment templates, such as from DNA or genomic DNA, using a transposase or transposome to fragment the original or starting nucleic acid sequence, such as genomic DNA, and to attach a different priming site sequence to each end of a cut or fragmentation site to thereby produce a set of fragments with each member of the set having two unique and different priming site sequences. The nucleic acid fragment templates are amplified to produce amplicons. The amplicons of the nucleic acid fragment templates may be collected and sequenced. The collected amplicons form a library of amplicons of the fragments of the original nucleic acid, such as genomic DNA. According to one exemplary aspect, methods are described of making nucleic acid fragments using an enzyme such as Tn5. Such methods are known in the art and include those practiced using the illumina Nextera kit. According to one exemplary aspect, methods described herein utilize a transposome library and a method referred to as "tagmentation" to the extent that fragments are created from a larger dsDNA sequence where the fragments are tagged with primers to be used in single primer extension and amplification.

According to one aspect, a genomic DNA, such as genomic nucleic acid obtained from a lysed single cell, is obtained. A plurality or library of transposomes is used to cut the genomic DNA into double stranded fragments. Each transposome of the plurality or library is a dimer of a transposase bound to a transposon DNA, i.e. each transposome includes two separate transposon DNA. Each transposon DNA of a transposome includes a transposase binding site and a primer binding site sequence. The primer binding site sequence is unique to the transposome. According to one aspect, the priming site sequence of each transposon of a transposome could be unique and/or different. According to one aspect, the priming site sequence of each transposon of a transposome could be the same. According to one aspect, the majority of the transposome has two transposon DNA that has different priming site sequences and only a small fraction of the transposome has two transposon DNA that has the same priming site sequence. According to one aspect, the priming site sequence of the two transposon DNA of each transposome member can be the same, but the priming site sequence or sequences of the transposon DNA from different transposome members are unique and different. The transposon nucleic acid sequences having priming site sequences that bind to the transposase may be methylated at every cytosine so the priming site sequence is not changed after cytosine conversion required for methylation detection.

According to one aspect, the priming site sequences of each transposon DNA of a transposome is unique and different. According to one aspect, the priming site sequence or sequences of the transposon DNA of a transposome is unique and different from the remaining members of the transposome plurality or library. According to one aspect, each transposome of the plurality or library of transposomes has its own unique and different priming site sequences which are different from the remaining members of the transposome plurality or library and may have two unique and different priming site sequences which are different from the remaining members of the transposome plurality or library. The transposon DNA becomes attached to the upper and lower strands of each double stranded fragment at each cut or fragmentation site. Since the priming site sequence may be different for each transposon DNA, the cut or fragmentation site is tagged with different priming site sequences. Since the priming site sequence may be the same for each transposon DNA, the cut or fragmentation site is tagged with the same priming site sequence. Where adjacent transposomes used to generate a fragment each have different primer binding site sequences associated therewith, the fragment has different primer binding site sequences at each end of the fragment. Accordingly, the fragment will have two unique and different primer binding site sequences. Since each transposome has its own unique and/or different priming site sequence associated therewith (and may have two unique and/or different priming site sequences associated therewith), and a library of transposomes are used to create many cut or fragmentation sites, each cut or fragmentation site will have a different and unique priming site sequence attached at either end of the cut site and each fragment will have different and/or unique priming site sequences on each end of the fragment. Accordingly, many fragments from the original nucleic acid sequence are created by the library of transposomes with each fragment having a dissimilar priming site sequence at each end of the fragment. The double stranded fragments are then processed to fill gaps. The fragments are amplified using suitable amplification reagents, such as a primer sequences, DNA polymerase and nucleotides for PCR amplification and are sequenced using methods known to those of skill in the art.

According to certain aspects, an exemplary transposon system includes Tn5 transposase, Mu transposase, Tn7 transposase or IS5 transposase and the like. Other useful transposon systems are known to those of skill in the art and include Tn3 transposon system (see Maekawa, T., Yanagihara, K., and Ohtsubo, E. (1996), A cell-free system of Tn3 transposition and transposition immunity, *Genes Cells* 1, 1007-1016), Tn7 transposon system (see Craig, N. L. (1991), Tn7: a target site-specific transposon, *Mol. Microbiol.* 5, 2569-2573), Tn10 tranposon system (see Chalmers, R., Sewitz, S., Lipkow, K., and Crellin, P. (2000), Complete nucleotide sequence of Tn10, *J. Bacteriol* 182, 2970-2972), Piggybac transposon system (see Li, X., Burnight, E. R., Cooney, A. L., Malani, N., Brady, T., Sander, J. D., Staber, J., Wheelan, S. J., Joung, J. K., McCray, P. B., Jr., et al. (2013), PiggyBac transposase tools for genome engineering, *Proc. Natl. Acad. Sci. USA* 110, E2279-2287), Sleeping beauty transposon system (see Ivics, Z., Hackett, P. B., Plasterk, R. H., and Izsvak, Z. (1997), Molecular reconstruction of Sleeping Beauty, a Tc1-like transposon from fish, and its transposition in human cells, *Cell* 91, 501-510), Tol2 transposon system (see Kawakami, K. (2007), Tol2: a versatile gene transfer vector in vertebrates, *Genome Biol.* 8 Suppl. 1, S7.)

Particular Tn5 transposition systems are described and are available to those of skill in the art. See Goryshin, I. Y. and W. S. Reznikoff, *Tn5 in vitro transposition*. The Journal of biological chemistry, 1998. 273(13): p. 7367-74; Davies, D. R., et al., *Three-dimensional structure of the Tn5 synaptic complex transposition intermediate*. Science, 2000. 289 (5476): p. 77-85; Goryshin, I. Y., et al., *Insertional transposon mutagenesis by electroporation of released Tn5 transposition complexes*. Nature biotechnology, 2000. 18(1): p. 97-100 and Steiniger-White, M., I. Rayment, and W. S. Reznikoff, *Structure/function insights into Tn5 transposition*. Current opinion in structural biology, 2004. 14(1): p. 50-7 each of which are hereby incorporated by reference in their entireties for all purposes. Kits utilizing a Tn5 transposition system for DNA library preparation and other uses are known. See Adey, A., et al., *Rapid, low-input, low-bias construction of shotgun fragment libraries by high-density in vitro transposition*. Genome biology, 2010. 11(12): p. R119; Marine, R., et al., *Evaluation of a transposase protocol for rapid generation of shotgun high-throughput sequencing libraries from nanogram quantities of DNA*. Applied and environmental microbiology, 2011. 77(22): p. 8071-9; Parkinson, N.J., et al., *Preparation of high-quality next-generation sequencing libraries from picogram quantities of target DNA*. Genome research, 2012. 22(1): p. 125-33; Adey, A. and J. Shendure, *Ultra-low-input, tagmentation-based whole-genome bisulfite sequencing*. Genome research, 2012. 22(6): p. 1139-43; Picelli, S., et al., *Full-length RNA-seq from single cells using Smart-seq2*. Nature protocols, 2014. 9(1): p. 171-81 and Buenrostro, J. D., et al., *Transposition of native chromatin for fast and sensitive epigenomic profiling of open chromatin, DNA-binding proteins and nucleosome position*. Nature methods, 2013, each of which is hereby incorporated by reference in its entirety for all purposes. See also WO 98/10077, EP 2527438 and EP 2376517 each of which is hereby incorporated by reference in its entirety. A commercially available transposition kit is marketed under the name NEXTERA and is available from Illumina.

Gap Filling

The double stranded fragments produced by the transposome methods described herein are then processed to fill gaps. According to one aspect, the transposon may include one or more methylated cytosines, such as methylated cytosine adapters or primers as described herein. For systems that use methylated cytosine adapters to perform Tn5 transposition, the gap filling step includes using methylated dCTP instead of dCTP in the dNTP mix so as to create fully methylated double stranded adapters.

Carrier DNA and Optional Purification

According to certain aspects, the gap filled fragments are then combined with carrier DNA. Carrier DNA can be any dsDNA fragments having a length between 100 base pairs (bp) to 4 kilo base pairs. According to one aspect, the carrier DNA may be a DNA type that is different from the target DNA. According to one aspect, the carrier DNA may be a DNA type that is the same as the target DNA. According to one aspect, the carrier DNA is sonicated lambda DNA. According to one aspect, carrier DNA does not include Illumina sequencing adapters.

The carrier DNA serves to protect the target DNA from the harsh conditions of chemical treatment and to reduce damage to the target DNA or loss of the target DNA. Regarding DNA damage, exemplary non-bisulfite conversion utilizes a strong oxidation reagent Fe(II), which will cause DNA damage by producing hydroxyl radicals. The carrier DNA, which is added to the reaction medium in an amount that is 100 to 10000 times (e.g., 100 to 1000 times) more in amount than the sample DNA, serves to occupy excess hydroxyl radicals and the prevent or limit their interaction with the target DNA. According to one exemplary aspect, for a 6 pg sample DNA from a single cell, 20 ng sonicated lambda carrier DNA is provided.

Regarding DNA loss, the conversion reaction uses a specialized buffer and purifications (buffer exchange while preserving DNA) before or even in between different steps. Also, a purification step to remove chemical reagents may be required before PCR amplification. Two or three purification steps may be carried out as a result of the cytosine conversion process. Each DNA purification step can result in 50%-90% DNA loss if the input DNA amount is low, such as DNA from a single cell. But if carrier DNA is added to the sample DNA, such as 20 ng lambda DNA added to 6 pg sample DNA, the DNA purification will only cause a 10% loss, resulting in the preservation of 90% of the sample DNA although mixed with carrier DNA. According to the present disclosure, efficiency of the DNA purification increases as the amount of input DNA increases.

According to certain aspects, the reaction medium including the gap-filled double stranded segments and carrier DNA can be purified by DNA spin-columns or beads-based DNA purification, or other purification methods known to those of skill in the art, before DNA conversion required for methylation detection. Alternatively, the reaction medium can proceed directly to chemical conversion.

Chemical Treatment

The gap filled fragments combined with carrier DNA proceeds to mix with chemical reagents that chemically change a cytosine to a uracil. Such chemical reagents are described in US 2013/0244237 and may be available from New England Biolabs. Other enzymatic reagents will become apparent to those of skill in the art based on the present disclosure. According to one aspect, the reagent is not bisulfite or excludes bisulfite or the reagent converts cytosine to uracil with the proviso that the reagent is not bisulfite.

Optional Purification

According to certain aspects, the reaction medium including the chemically converted fragments can be purified by DNA spin-columns or beads-based DNA purification, or other purification methods known to those of skill in the art, before amplification. Alternatively, the reaction medium can proceed directly to amplification.

Amplification

According to one aspect, amplification of only the target fragments is carried out by using primers that target the adapter sequences incorporated into the fragments by the transposomes. Carrier DNA is not amplified and is becomes ssDNA due to denaturation.

The expression "amplification" or "amplifying" refers to a process by which extra or multiple copies of a particular polynucleotide are formed. DNA to be amplified may be obtained from a single cell or a small population of cells. Methods described herein allow DNA to be amplified from any species or organism in a reaction mixture, such as a single reaction mixture carried out in a single reaction vessel. In one aspect, methods described herein include sequence independent amplification of DNA from any source including but not limited to human, animal, plant, yeast, viral, eukaryotic and prokaryotic DNA.

DNA fragment templates made using the transposase methods described herein can be amplified within microdroplets using methods known to those of skill in the art. Microdroplets may be formed as an emulsion of an oil phase and an aqueous phase. An emulsion may include aqueous droplets or isolated aqueous volumes within a continuous oil phase. Emulsion whole genome amplification methods are described using small volume aqueous droplets in oil to isolate each fragment for uniform amplification of a single cell's genome. By distributing each fragment into its own droplet or isolated aqueous reaction volume, each droplet is allowed to reach saturation of DNA amplification. The amplicons within each droplet are then merged by demulsification resulting in an even amplification of all of the fragments of the whole genome of the single cell.

In certain aspects, amplification is achieved using PCR. PCR is a reaction in which replicate copies are made of a target polynucleotide using a pair of primers or a set of primers consisting of an upstream and a downstream primer, and a catalyst of polymerization, such as a DNA polymerase, and typically a thermally-stable polymerase enzyme. Methods for PCR are well known in the art, and taught, for example in MacPherson et al. (1991) PCR 1: A Practical Approach (IRL Press at Oxford University Press). The term "polymerase chain reaction" ("PCR") of Mullis (U.S. Pat. Nos. 4,683,195, 4,683,202, and 4,965,188) refers to a method for increasing the concentration of a segment of a target sequence without cloning or purification. This process for amplifying the target sequence includes providing oligonucleotide primers with the desired target sequence and amplification reagents, followed by a precise sequence of thermal cycling in the presence of a polymerase (e.g., DNA polymerase). The primers are complementary to their respective strands ("primer binding sequences") of the double stranded target sequence. To effect amplification, the double stranded target sequence is denatured and the primers then annealed to their complementary sequences within the target molecule. Following annealing, the primers are extended with a polymerase so as to form a new pair of complementary strands. The steps of denaturation, primer annealing, and polymerase extension can be repeated many times (i.e., denaturation, annealing and extension constitute one "cycle;" there can be numerous "cycles") to obtain a high concentration of an amplified segment of the desired target sequence. The length of the amplified segment of the desired target sequence is determined by the relative positions of the primers with respect to each other, and therefore, this length is a controllable parameter. By virtue of the repeating aspect of the process, the method is referred to as the "polymerase chain reaction" (hereinafter "PCR") and the target sequence is said to be "PCR amplified."

With PCR, it is possible to amplify a single copy of a specific target sequence in genomic DNA to a level detectable by several different methodologies (e.g., hybridization with a labeled probe; incorporation of biotinylated primers followed by avidin-enzyme conjugate detection; incorporation of 32P-labeled deoxynucleotide triphosphates, such as dCTP or dATP, into the amplified segment). In addition to genomic DNA, any oligonucleotide or polynucleotide sequence can be amplified with the appropriate set of primer molecules. In particular, the amplified segments created by the PCR process itself within each microdroplet are, themselves, efficient templates for subsequent PCR amplifications. Methods and kits for performing PCR are well known in the art. All processes of producing replicate copies of a polynucleotide, such as PCR or gene cloning, are collectively referred to herein as replication. A primer can also be used as a probe in hybridization reactions, such as Southern or Northern blot analyses.

The expression "amplification" or "amplifying" refers to a process by which extra or multiple copies of a particular polynucleotide are formed. Amplification includes methods such as PCR, ligation amplification (or ligase chain reaction, LCR) and other amplification methods. These methods are known and widely practiced in the art. See, e.g., U.S. Pat. Nos. 4,683,195 and 4,683,202 and Innis et al., "PCR protocols: a guide to method and applications" Academic Press, Incorporated (1990) (for PCR); and Wu et al. (1989) Genomics 4:560-569 (for LCR). In general, the PCR procedure describes a method of gene amplification which is comprised of (i) sequence-specific hybridization of primers to specific genes within a DNA sample (or library), (ii) subsequent amplification involving multiple rounds of annealing, elongation, and denaturation using a DNA polymerase, and (iii) screening the PCR products for a band of the correct size. The primers used are oligonucleotides of sufficient length and appropriate sequence to provide initiation of polymerization, i.e. each primer is specifically designed to be complementary to each strand of the genomic locus to be amplified.

Reagents and hardware for conducting amplification reactions are commercially available. Primers useful to amplify sequences from a particular gene region are preferably complementary to, and hybridize specifically to sequences in the target region or in its flanking regions and can be prepared using methods known to those of skill in the art. Nucleic acid sequences generated by amplification can be sequenced directly.

When hybridization occurs in an antiparallel configuration between two single-stranded polynucleotides, the reaction is called "annealing" and those polynucleotides are described as "complementary". A double-stranded polynucleotide can be complementary or homologous to another polynucleotide, if hybridization can occur between one of the strands of the first polynucleotide and the second. Complementarity or homology (the degree that one polynucleotide is complementary with another) is quantifiable in terms of the proportion of bases in opposing strands that are expected to form hydrogen bonding with each other, according to generally accepted base-pairing rules.

The terms "PCR product," "PCR fragment," and "amplification product" refer to the resultant mixture of compounds after two or more cycles of the PCR steps of denaturation, annealing and extension are complete. These terms encompass the case where there has been amplification of one or more segments of one or more target sequences.

The term "amplification reagents" may refer to those reagents (deoxyribonucleotide triphosphates, buffer, etc.), needed for amplification except for primers, nucleic acid template, and the amplification enzyme. Typically, amplification reagents along with other reaction components are placed and contained in a reaction vessel (test tube, microwell, etc.). Amplification methods include PCR methods known to those of skill in the art and also include rolling circle amplification (Blanco et al., J. Biol. Chem., 264, 8935-8940, 1989), hyperbranched rolling circle amplification (Lizard et al., Nat. Genetics, 19, 225-232, 1998), and loop-mediated isothermal amplification (Notomi et al., Nuc. Acids Res., 28, e63, 2000) each of which are hereby incorporated by reference in their entireties.

For emulsion PCR, an emulsion PCR reaction is created by vigorously shaking or stirring a "water in oil" mix to generate millions of micron-sized aqueous compartments. Microfluidic chips may be equipped with a device to create an emulsion by shaking or stirring an oil phase and a water phase. Alternatively, aqueous droplets may be spontaneously formed by combining a certain oil with an aqueous phase or introducing an aqueous phase into an oil phase. The DNA library to be amplified is mixed in a limiting dilution prior to emulsification. The combination of compartment size, i.e. microdroplet size, and amount of microdroplets created limiting dilution of the DNA fragment library to be amplified is used to generate compartments containing, on average, just one DNA molecule. Depending on the size of the aqueous compartments generated during the microdroplet formation or emulsification step, up to $3 \times 10^9$ individual PCR reactions per µl can be conducted simultaneously in the same tube. Essentially each little aqueous compartment microdroplet in the emulsion forms a micro PCR reactor. The average size of a compartment in an emulsion ranges from sub-micron in diameter to over a 100 microns, or from 1 picoliter to 1000 picoliters or from 1 nanoliter to 1000 nanoliters or from 1 picoliter to 1 nanoliter or from 1 picoliter to 1000 nanoliters depending on the emulsification conditions.

Other amplification methods, as described in British Patent Application No. GB 2,202,328, and in PCT Patent Application No. PCT/US89/01025, each incorporated herein by reference, may be used in accordance with the present disclosure. In the former application, "modified" primers are used in a PCR-like template and enzyme dependent synthesis. The primers may be modified by labeling with a capture moiety (e.g., biotin) and/or a detector moiety (e.g., enzyme). In the latter application, an excess of labeled probes are added to a sample. In the presence of the target sequence, the probe binds and is cleaved catalytically. After cleavage, the target sequence is released intact to be bound by excess probe. Cleavage of the labeled probe signals the presence of the target sequence.

Other suitable amplification methods include "race and "one-sided PCR." (Frohman, In: PCR Protocols: A Guide To Methods And Applications, Academic Press, N.Y., 1990, each herein incorporated by reference). Methods based on ligation of two (or more) oligonucleotides in the presence of nucleic acid having the sequence of the resulting "di-oligonucleotide," thereby amplifying the di-oligonucleotide, also may be used to amplify DNA in accordance with the present disclosure (Wu et al., Genomics 4:560-569, 1989, incorporated herein by reference).

As used herein, the term "primer" generally includes an oligonucleotide, either natural or synthetic, that is capable, upon forming a duplex with a polynucleotide template, of acting as a point of initiation of nucleic acid synthesis, such as a sequencing primer, and being extended from its 3' end along the template so that an extended duplex is formed. The sequence of nucleotides added during the extension process is determined by the sequence of the template polynucleotide. Usually primers are extended by a DNA polymerase. Primers usually have a length in the range of between 3 to 36 nucleotides, also 5 to 24 nucleotides, also from 14 to 36 nucleotides. Primers within the scope of the invention include orthogonal primers, amplification primers, constructions primers and the like. Pairs of primers can flank a sequence of interest or a set of sequences of interest. Primers and probes can be degenerate or quasi-degenerate in sequence. Primers within the scope of the present invention bind adjacent to a target sequence. A "primer" may be considered a short polynucleotide, generally with a free 3'—OH group that binds to a target or template potentially present in a sample of interest by hybridizing with the target, and thereafter promoting polymerization of a polynucleotide complementary to the target. Primers of the instant invention are comprised of nucleotides ranging from 17 to 30 nucleotides. In one aspect, the primer is at least 17 nucleotides, or alternatively, at least 18 nucleotides, or alternatively, at least 19 nucleotides, or alternatively, at least 20 nucleotides, or alternatively, at least 21 nucleotides, or alternatively, at least 22 nucleotides, or alternatively, at least 23 nucleotides, or alternatively, at least 24 nucleotides, or alternatively, at least 25 nucleotides, or alternatively, at least 26 nucleotides, or alternatively, at least 27 nucleotides, or alternatively, at least 28 nucleotides, or alternatively, at least 29 nucleotides, or alternatively, at least 30 nucleotides, or alternatively at least 50 nucleotides, or alternatively at least 75 nucleotides or alternatively at least 100 nucleotides.

Purification

According to certain aspects, the reaction medium including the amplified fragments can be purified by DNA spin-columns or beads-based DNA purification, or other purification methods known to those of skill in the art, before sequencing. DNA purification followed after amplification, such as by PCR reaction, will remove most single-stranded carrier DNA, which results in a pure amplified target DNA library ready for sequencing.

Sequencing

The DNA amplified according to the methods described herein may be sequenced and analyzed using methods known to those of skill in the art. Determination of the sequence of a nucleic acid sequence of interest can be performed using a variety of sequencing methods known in the art including, but not limited to, sequencing by hybridization (SBH), sequencing by ligation (SBL) (Shendure et al. (2005) Science 309:1728), quantitative incremental fluorescent nucleotide addition sequencing (QIFNAS), stepwise ligation and cleavage, fluorescence resonance energy transfer (FRET), molecular beacons, TaqMan reporter probe digestion, pyrosequencing, fluorescent in situ sequencing (FISSEQ), FISSEQ beads (U.S. Pat. No. 7,425,431), wobble sequencing (PCT/US05/27695), multiplex sequencing (U.S. Ser. No. 12/027,039, filed Feb. 6, 2008; Porreca et al (2007) Nat. Methods 4:931), polymerized colony (POLONY) sequencing (U.S. Pat. Nos. 6,432,360, 6,485,944 and 6,511,803, and PCT/US05/06425); nanogrid rolling circle sequencing (ROLONY) (U.S. Ser. No. 12/120,541, filed May 14, 2008), allele-specific oligo ligation assays (e.g., oligo ligation assay (OLA), single template molecule OLA using a ligated linear probe and a rolling circle amplification (RCA) readout, ligated padlock probes, and/or single template molecule OLA using a ligated circular padlock probe and a rolling circle amplification (RCA) readout) and the like. High-throughput sequencing methods, e.g., using platforms such as Roche 454, Illumina Solexa, AB-SOLID, Helicos, Polonator platforms and the like, can also be utilized. A variety of light-based sequencing technologies are known in the art (Landegren et al. (1998) Genome Res. 8:769-76; Kwok (2000) Pharmacogenomics 1:95-100; and Shi (2001) Clin. Chem. 47:164-172).

The amplified DNA can be sequenced by any suitable method. In particular, the amplified DNA can be sequenced using a high-throughput screening method, such as Applied Biosystems' SOLID sequencing technology, or Illumina's Genome Analyzer. In one aspect of the invention, the amplified DNA can be shotgun sequenced. The number of reads can be at least 10,000, at least 1 million, at least 10 million, at least 100 million, or at least 1000 million. In another aspect, the number of reads can be from 10,000 to 100,000, or alternatively from 100,000 to 1 million, or alternatively from 1 million to 10 million, or alternatively from 10 million to 100 million, or alternatively from 100 million to 1000 million. A "read" is a length of continuous nucleic acid sequence obtained by a sequencing reaction.

"Shotgun sequencing" refers to a method used to sequence very large amount of DNA (such as the entire genome). In this method, the DNA to be sequenced is first shredded into smaller fragments which can be sequenced individually. The sequences of these fragments are then reassembled into their original order based on their overlapping sequences, thus yielding a complete sequence. "Shredding" of the DNA can be done using a number of difference techniques including restriction enzyme digestion or mechanical shearing. Overlapping sequences are typically aligned by a computer suitably programmed. Methods and programs for shotgun sequencing a cDNA library are well known in the art.

The amplification and sequencing methods are useful in the field of predictive medicine in which diagnostic assays, prognostic assays, pharmacogenomics, and monitoring clinical trials are used for prognostic (predictive) purposes to thereby treat an individual prophylactically. Accordingly, one aspect of the present invention relates to diagnostic assays for determining the genomic DNA in order to determine whether an individual is at risk of developing a disorder and/or disease. Such assays can be used for prognostic or predictive purposes to thereby prophylactically treat an individual prior to the onset of the disorder and/or disease. Accordingly, in certain exemplary embodiments, methods of diagnosing and/or prognosing one or more diseases and/or disorders using one or more of expression profiling methods described herein are provided.

Electronic Embodiments

In certain exemplary embodiments, electronic apparatus readable media comprising one or more genomic DNA sequences described herein is provided. As used herein, "electronic apparatus readable media" refers to any suitable medium for storing, holding or containing data or information that can be read and accessed directly by an electronic apparatus. Such media can include, but are not limited to: magnetic storage media, such as floppy discs, hard disc storage medium, and magnetic tape; optical storage media such as compact disc; electronic storage media such as RAM, ROM, EPROM, EEPROM and the like; general hard disks and hybrids of these categories such as magnetic/optical storage media. The medium is adapted or configured for having recorded thereon one or more expression profiles described herein.

As used herein, the term "electronic apparatus" is intended to include any suitable computing or processing apparatus or other device configured or adapted for storing data or information. Examples of electronic apparatuses suitable for use with the present invention include stand-alone computing apparatus; networks, including a local area network (LAN), a wide area network (WAN) Internet, Intranet, and Extranet; electronic appliances such as a personal digital assistants (PDAs), cellular phone, pager and the like; and local and distributed processing systems.

As used herein, "recorded" refers to a process for storing or encoding information on the electronic apparatus readable medium. Those skilled in the art can readily adopt any of the presently known methods for recording information on known media to generate manufactures comprising one or more expression profiles described herein.

A variety of software programs and formats can be used to store the genomic DNA information of the present invention on the electronic apparatus readable medium. For example, the nucleic acid sequence can be represented in a word processing text file, formatted in commercially-available software such as WordPerfect and Microsoft Word, or represented in the form of an ASCII file, stored in a database application, such as DB2, Sybase, Oracle, or the like, as well as in other forms. Any number of data processor structuring formats (e.g., text file or database) may be employed in order to obtain or create a medium having recorded thereon one or more expression profiles described herein.

It is to be understood that the embodiments of the present invention which have been described are merely illustrative of some of the applications of the principles of the present invention. Numerous modifications may be made by those skilled in the art based upon the teachings presented herein without departing from the true spirit and scope of the invention. The contents of all references, patents and published patent applications cited throughout this application are hereby incorporated by reference in their entirety for all purposes.

The following examples are set forth as being representative of the present invention. These examples are not to be construed as limiting the scope of the invention as these and other equivalent embodiments will be apparent in view of the present disclosure, figures and accompanying claims.

Example I

According to certain exemplary aspects, a transposition system is used to make nucleic acid fragments for chemical methylation treatment including carrier DNA, amplification, and sequencing as desired. According to one aspect, a transposition system is used to fragment genomic DNA into double stranded genomic DNA fragments with the transposon DNA having different priming site sequences inserted therein. As illustrated in FIG. 1, a transposon DNA includes a double stranded transposase binding site and a unique and different priming site sequence M. Though not illustrated in FIG. 1, the transposon DNA can include one or more 5-methylcytosines. The double stranded transposase binding site may be a double-stranded 19 bp Tn5 transposase (Tnp) binding site which is linked or connected, such as by covalent bond, to a single-stranded overhang including a priming site sequence, such as at one end of the overhang. The transposon DNA is inserted into the genomic DNA of a single cell while creating fragments using a transposase. After transposase removal and gap fill-in, the genomic DNA fragments having dissimilar or different or unique priming site sequences at each end of the fragment are amplified using primers together with a DNA polymerase, nucleotides and amplification reagents to PCR amplify the whole genome of the single cell.

According to certain aspects when amplifying low or small amounts of DNA such as DNA from a few cells, i.e. 2 to 5 or 2 to 10 cells or 2 to 100 or a single cell, a DNA column purification step is not carried out so as to maximize the small amount (~6 pg) of genomic DNA that can be obtained from within a single cell prior to amplification. The DNA can be amplified directly from a cell lysate or other impure condition. Accordingly, the DNA sample may be impure, unpurified, or not isolated. Accordingly, aspects of the present method allow one to maximize genomic DNA for amplification and reduce loss due fragments having the same priming site sequence on each end as with other methods, i.e. non-multiplex methods. According to an additional aspect, methods described herein may utilize amplification methods other than PCR.

Figure 2:
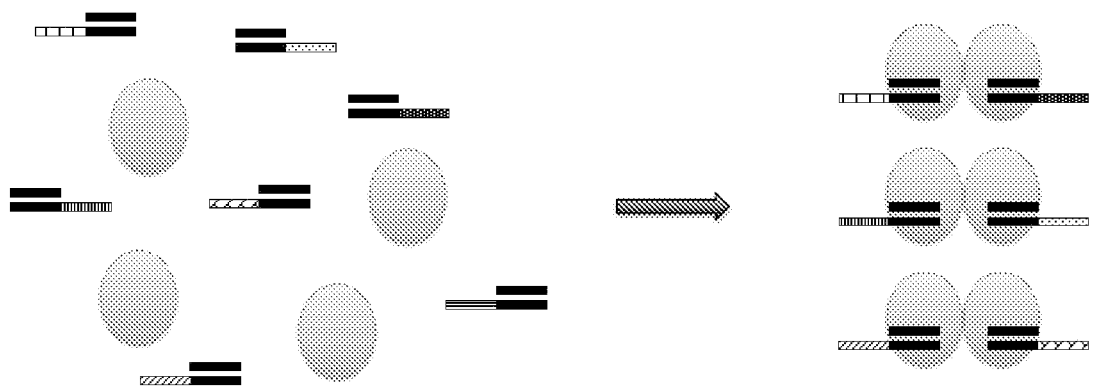
FIG. 2 is a schematic of a general embodiment of transposase and transposon DNA spontaneously forming a transposome, which may occur within a droplet or other formation media. Prior to transposome formation, each transposon has a different and unique priming site sequence represented by different patterns. After transposome formation, each transposon of the transposome has a different and unique priming site sequence represented by different patterns.

According to one aspect and as illustrated in general in FIG. 2, transposase (Tnp, grey circles) and the transposon DNA each having unique and different priming site sequences illustrated by different pattern overhang sequences are combined to form a plurality of transposomes. Each transposome has two different and unique priming site sequences. Each transposome has two different and unique priming site sequences compared to each other transposome within the plurality. To make a pool of transposon mixtures of 20 transposon sequences, equal molar of each type of transposon sequences are mixed in a buffer containing 10 mM Tris pH=8, 50 mM NaCl and 1 mM EDTA. To assemble transposome complexes, the 20 transposon pool is mixed with Tn5 transposase at equal molar ratio and incubated at room temperature for 30 minutes.

Figure 3A:
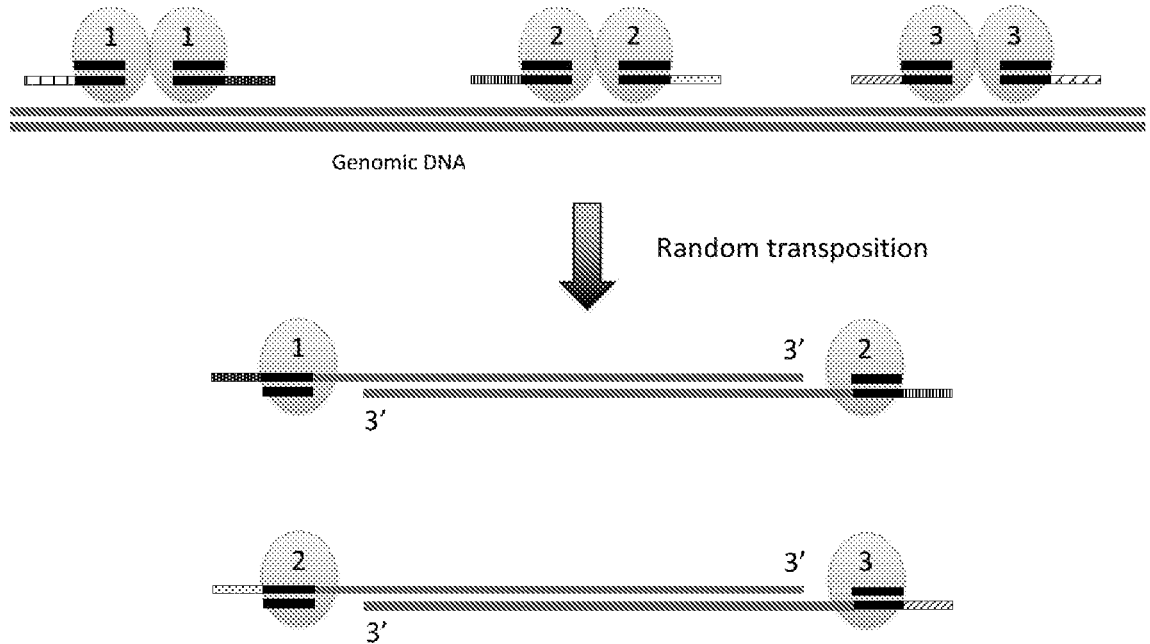
FIG. 3A is a schematic of transposome binding to genomic DNA, cutting into fragments and addition or insertion of transposon DNA including a transposase binding site (black) and a unique and different priming site sequence on each transposon of each transposome as represented in each transposome by different patterns.

As shown in FIG. 3A, the transposomes of the transposome library randomly capture or otherwise bind to the target single-cell genomic DNA as dimers. Representative transposomes are numbered 1, 2 and 3, though the number of transposome members can be greater depending on the desired application. A representative number of transposons having different and/or unique primer binding site sequences is between 5 and 50. Each transposome includes two unique and/or different priming site sequences. For example, transposome 1 includes two unique and/or different priming site sequences, transposome 2 includes two unique and/or different priming site sequences, transposome 3 includes two unique and/or different priming site sequences, etc. The unique and/or different priming site sequence is within each transposon DNA of the transposome. The transposases in the transposome cut the genomic DNA with one transposase cutting an upper strand and one transposase cutting a lower strand to create a genomic DNA fragment. Though not shown in FIG. 3A, the fragment can include one or more cytosines or one or more 5-methylcytosines. The plurality of transposomes creates a plurality of genomic DNA fragments, with one or more fragments including one or more cytosines or one or more 5-methylcytosines.

One transposon DNA from the transposon DNA dimer is thus attached to each end of the cut site or fragmentation site, i.e., one transposon DNA from transposome 1 is attached to the left hand cut site and the other transposon DNA from transposome 1 is attached to the right hand cut site. Since the transposome library cuts the nucleic acid into fragments, each fragment will have a dissimilar priming site sequence at each end of the fragment. This is represented by the two exemplary fragments where the upper fragment has unique and different priming site sequence 1 on one end and unique and different priming site sequence 2 on the other end. Likewise, the lower fragment has unique and different priming site sequence 2 on one end and unique and different priming site sequence 3 on the other end. As illustrated, the cut site between the two fragments is produced by transposome 2 and the left hand cut site (i.e. viewing the right side of the upper fragment in FIG. 3) includes the one transposon with unique and different priming site sequence 2 while the right hand cut site (i.e. viewing the left side of the lower fragment in FIG. 3) includes unique and different priming site sequence 2 (with "2" referring to transposome 2). According to one aspect, 100 nM transposome is added to cell lysate and the transposition reaction mixture is incubated at 55 degree for 10 minutes with magnesium final concentration of 5 mM. After removing the transposase, the genomic DNA is cut into millions of small DNA fragments, each tagged with one of the 20 transposon sequences at each end. (FIG. 3A) In this manner, the transposome library may include 20 different and/or unique primer binding site sequences as described herein while the members of the transposome library may approach millions of members.

Figure 3B:
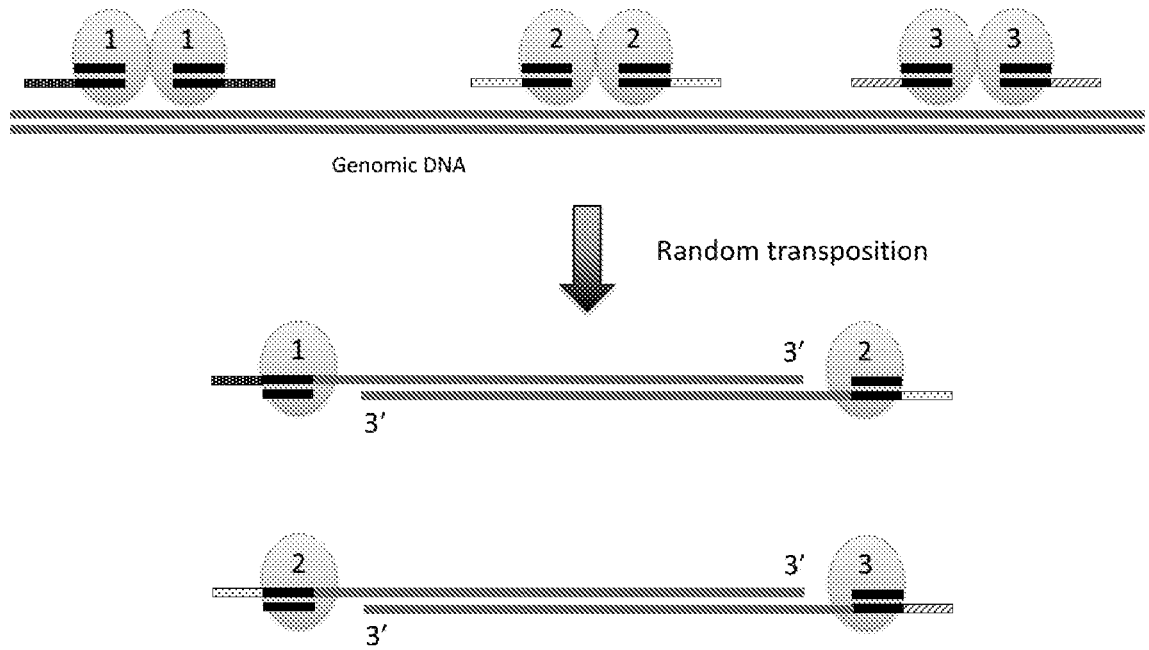
FIG. 3B is a schematic of transposome binding to genomic DNA, cutting into fragments and addition or insertion of transposon DNA including a transposase binding site (black) and a unique and different priming site sequence representative of the transposome, i.e. the same unique and different primer binding site sequence is present on each transposon of the transposome, as represented in each transposome by the same pattern. The different primer binding site sequences between each transposome are represented by different patterns.

As shown in FIG. 3B, the transposomes of the transposome library randomly capture or otherwise bind to the target single-cell genomic DNA as dimers. Representative transposomes are numbered 1, 2 and 3, though the number of transposome members can be greater depending on the desired application. A representative number of transposons having different and/or unique primer binding site sequences is between 5 and 50. Each transposome includes the same unique and/or different primer binding site sequence at each transposon of the transposome. For example, transposome 1 includes the same primer binding site sequence on each transposon, transposome 2 includes the same primer binding site sequence on each transposon, transposome 3 includes the same primer binding site sequence on each transposon, etc. However, each transposome has a unique and different primer binding site associated therewith, such that each transposome has a different primer binding site associated therewith compared to other members of the transposome library. The transposases in the transposome cut the genomic DNA with one transposase cutting an upper strand and one transposase cutting a lower strand to create a genomic DNA fragment. The plurality of transposomes creates a plurality of genomic DNA fragments with one or more fragments including one or more cytosines or one or more 5-methylcytosines for chemical treatment to change cytosines to uracils. One transposon DNA from the transposon DNA dimer is thus attached to each end of the cut site or fragmentation site, i.e., one transposon DNA from transposome 1 is attached to the left hand cut site and the other transposon DNA from transposome 1 is attached to the right hand cut site. Since the transposome library cuts the nucleic acid into fragments, each fragment will have a dissimilar priming site sequence at each end of the fragment, since adjacent transposomes bound to the nucleic acid which create the fragment each have different primer binding site sequences. This is represented by the two exemplary fragments where the upper fragment has unique and different priming site sequence 1 on one end and unique and different priming site sequence 2 on the other end. Likewise, the lower fragment has unique and different priming site sequence 2 on one end (which is the same primer binding site sequence as on the right end of the upper fragment) and unique and different priming site sequence 3 on the other end. As illustrated, the cut site between the two fragments is produced by transposome 2 and the left hand cut site (i.e. viewing the right side of the upper fragment in FIG. 3) includes the one transposon with unique and different priming site sequence 2 while the right hand cut site (i.e. viewing the left side of the lower fragment in FIG. 3) includes unique and different priming site sequence 2 (with "2" referring to transposome 2). Accordingly, even where the transposome has the same primer binding site sequence on each transposon, the method results in a fragment having different primer binding site sequences at each end of the fragment.

Figure 4:
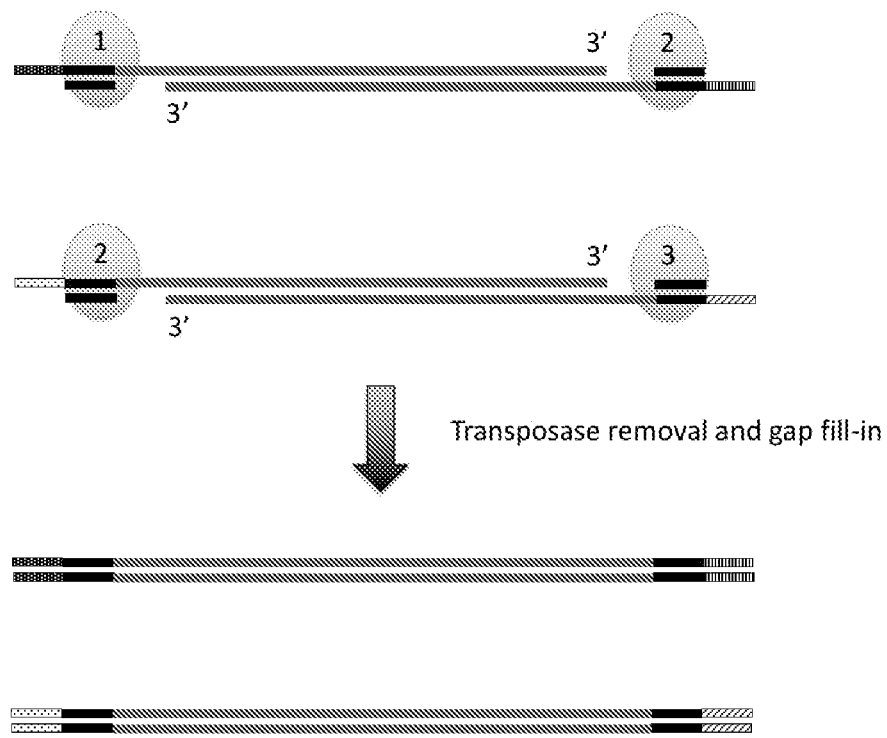
FIG. 4 is a schematic of transposase removal, gap filling to form nucleic acid extension products including genomic DNA, transposase binding site and a unique and different priming site sequence on each end of the extension product.

As illustrated in FIG. 4, the fragmentation of the genomic DNA and insertion of the methyl transposons leaves a gap on both ends of the transposition/insertion site. The gap may have any length but a 9 base gap is exemplary. The result is a genomic DNA fragment with a transposon DNA Tnp binding site attached to the 5' position of an upper strand and a transposon DNA Tnp binding site attached to the 5' position of a lower strand. Gaps resulting from the attachment or insertion of the transposon DNA are shown. After transposition, the transposase is removed and gap extension is performed to fill the gap and complement the single-stranded overhang originally designed in the transposon DNA as shown in FIG. 4. Thereafter the gap-filled fragments are subject to chemical treatment to convert cytosine to uracil in the presence of carrier DNA. These chemically processed fragments can then be subject to amplification and purification as described herein.

Figure 5:
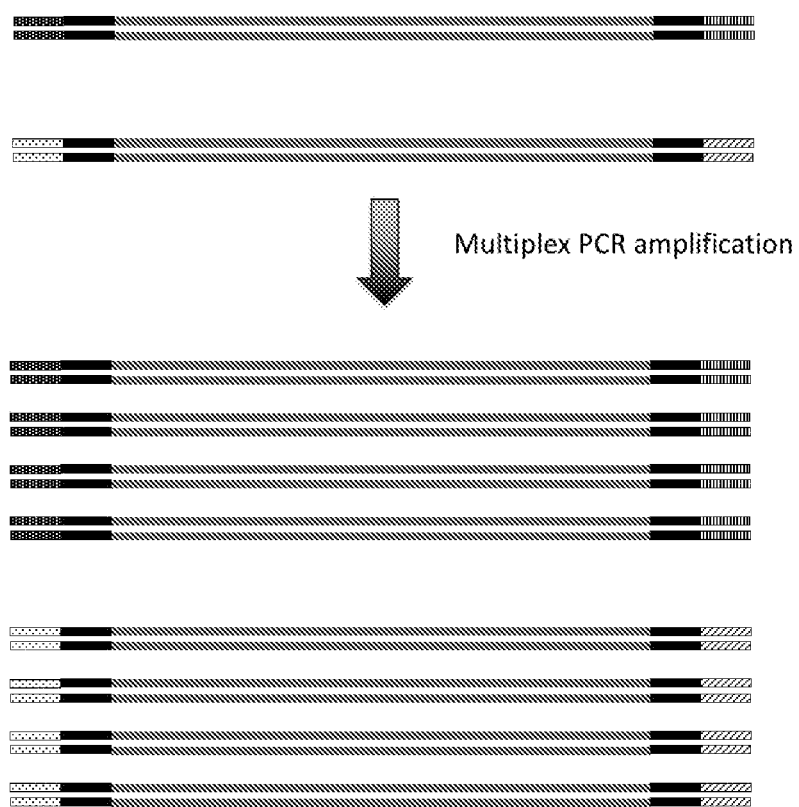
FIG. 5 is a schematic showing multiplex PCR amplification of the fragments of FIG. 4.
Figure 6:
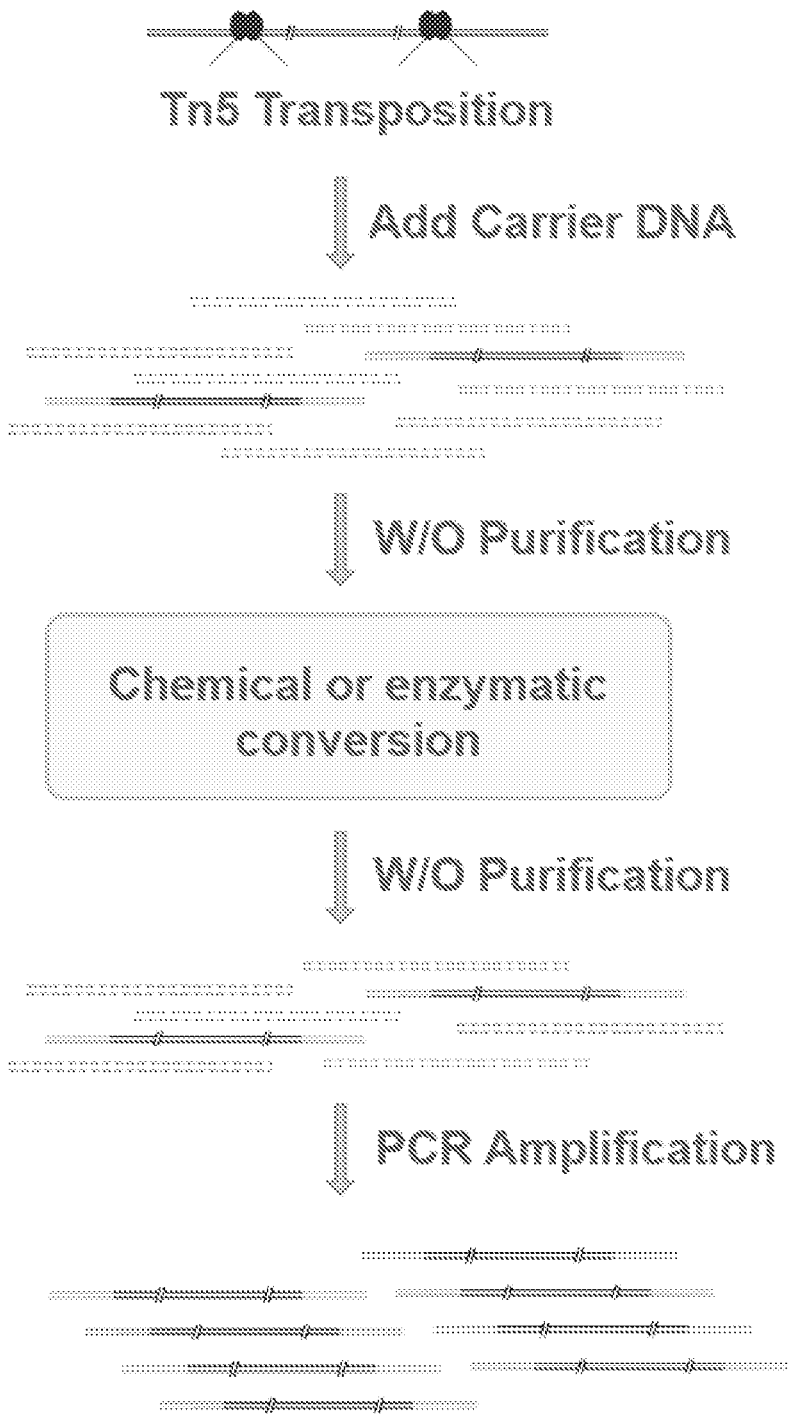
FIG. 6 is a schematic showing the general workflow of the low-input methylation detection method.

According to one aspect, a DNA polymerase reaction mixture containing 200 μM each dNTPs, 1×NEB Q5 reaction buffer, 125 nM each of 20 primers and 0.02 U/uL Q5 DNA polymerase is then added and incubated at 72° C. for 3 minutes to fill the gap left by the transposition (FIG. 4). As further illustrated in FIG. 5, the fragments shown in FIG. 4 are subject to multiplex PCR amplification to produce amplicons. 15 cycles of PCR reactions are performed as: 98° C. 30 s, 65° C. 1 min, 72° C. 2 min to amplify the target genomic DNA. The amplification products are then purified by Zymo DNA purification column.

Example II

General Protocol

A single cell is lysed in lysis buffer. Tn5 transposition is carried out using a transposome library including transposomes each with a different and unique primer binding site sequence (or each with two different and unique primer binding site sequences) as described herein and including methyl transposons and transposition buffer are added to the cell lysis which is mixed well and is incubated at 55° C. for 10 minutes. 1 mg/ml protease is added after the transposition to remove the transposase from binding to the single cell genomic DNA. Q5 DNA polymerase, dNTP, PCR reaction buffer and primers are added to the reaction mixture which is heated to 72° C. for 10 min to fill in the gap generated from the transposon insertion. Carrier DNA, such as sonicated lambda DNA between 100 bp and 4000 bp, and chemical reagents or enzymatic reagents for converting cytosine to uracil are added and cytosine to uracil conversion is carried out. This step can be carried out without prior purification. Then, the chemically processed fragments are subjected to 5 to 25 cycles of PCR reaction to amplify the single cell genomic DNA. This step can be carried out without purification. The amplification products are purified for further analysis such as by high through put deep sequencing.

Example III

Cell Lysis

A cell is selected, cut from a culture dish, and dispensed in a tube using a laser dissection microscope (LMD-6500, Leica) as follows. The cells are plated onto a membrane-coated culture dish and observed using bright field microscopy with a 10× objective (Leica). A UV laser is then used to cut the membrane around an individually selected cell such that it falls into the cap of a PCR tube. The tube is briefly centrifuged to bring the cell down to the bottom of the tube. 3-5 µl lysis buffer (30 mM Tris-CI PH 7.8, 2 mM EDTA, 20 mM KCl, 0.2% Triton X-100, 500 µg/ml Qiagen Protease) is added to the side of the PCR tube and span down. The captured cell is then thermally lysed using the following temperature schedule on PCR machine: 50° C. 3 hours, 75° C. 30 minutes. Alternatively, mouth pipette a single cell into a low salt lysis buffer containing EDTA and protease such as QIAGEN protease (QIAGEN) at a concentration of 10-5000 µg/mL. The incubation condition varies based on the protease that is used. In the case of QIAGEN protease, the incubation would be 37-55° C. for 1-4 hrs. The protease is then heat inactivated up to 80° C. and further inactivated by specific protease inhibitors such as 4-(2-Aminoethyl)benzenesulfonyl fluoride hydrochloride (AEBSF) or phenylmethanesulfonyl fluoride (PMSF) (Sigma Aldrich). The cell lysis is preserved at −80° C.

An exemplary single cell lysis procedure is as follows:

(1) A lysis buffer is prepared from a) 20 uL 1 M Tris pH 8.0 (Invitrogen 15568025; final: 20 mM); b) 4 uL 5 M NaCl (Invitrogen AM9760G; final: 20 mM); c) 15 uL 10% Triton X-100 (Sigma 93443; final: 0.15%); d) 150 uL 100 mM DTT (Sigma 43816; final: 15 mM); e) 2 uL 0.5 M EDTA (Invitrogen AM9260G; final: 1 mM); f) 5 uL 100 uM Carrier ssDNA (final: 500 nM); and g) 804 uL water. The combination is mixed and stored at −20° C.

(2) 2× transposition buffer is prepared (5 uL per cell; recipe below for 1 mL) as follows. a) 20 uL 1 M TAPS pH 8.5 (Boston Bio Products BB-2375) (final: 20 mM); b) 10 uL 1 M MgCl2 (final: 10 mM); c) 320 uL 50% PEG 8000 (Hampton Research HR2-535) (final: 16%); d) 650 uL water. The combination is mixed and stored at −20° C.

(3) Lysis is carried as follows. 7.5 mg/mL Qiagen Protease is prepared from a) 1 uL 60 mg/mL Qiagen Protease and b) 7 uL water. 2 µl lysis buffer is added per tube. 0.5 µl 7.5 mg/ml QP is added per tube. Cells are lysed in a 2.5 uL volume in close tight PCR machine with the following cycles: a) 50 C for 1 h; b) 65 C for 1 h; b) 70 C for 15 min; c) 4 C constant.

Example IV

Transposition

The single cell lysis and the transposome library are mixed in a buffer system containing 1-100 mM Mg$^{2+}$ and optionally 1-100 mM Mn$^{2+}$ or Co$^{2+}$ or Ca$^{2+}$ as well and incubate at 37-55° C. for 5-240 minutes. The reaction volume varies depending on the cell lysis volume. The amount of transposome library added in the reaction could be readily tuned depending on the desired fragmentation size. The transposition reaction is stopped by chelating Mg$^{2+}$ using EDTA and optionally EGTA or other chelating agents for ions. Optionally, short double stranded DNA could be added to the mixture as a spike-in. The residue transposome is inactivated by protease digestion such as QIAGEN protease at a final concentration 1-500 µg/mL at 37-55° C. for 10-60 minutes. The protease is then inactivated by heat and/or protease inhibitor, such as AEBSF.

An exemplary method and constructs are provided as follows

Nextera Construct:

Nextera transposons have one strand of 5'-/Phos/-CTGTCTCTTATACACATCT-3' (SEQ ID NO: strand of either 5'-1) and one 5mC modified TMGTMGGMAGMGT-MAGATGTGTATAAGAGAMAG-3' ("P5") (SEQ ID NO: 2) or 5'-GTMTMGTGGGMTMG-GAGATGTGTATAAGAGAMAG-3' ("P7") (SEQ ID NO: 3) (IDT, purification: PAGE). Nextera XT (Illumina) can also be used. M stands for methylated cytosine.

Nextera index primers (IDT, purification: standard desalting; then dissolved in 0.1×TE to 5 uM and stored at −20 C) are in the format of 5'-CAAGCAGAAGACGGCATACGAGAT(SEQ ID NO: 44)-[i7]-GTCTCGTGGGCTCGG(SEQ ID NO: 45)-3'
and 5'-AATGATACGGCGACCACCGAGATCTAC
AC(SEQ ID NO: 46)-[i5]-
TCGTCGGCAGCGTC(SEQ ID NO: 47)-3'.

The sequences are as follows:

701:
(SEQ ID NO: 4)
CAAGCAGAAGACGGCATACGAGATTCGCCTTAGTCTCGTGGGCTCGG

702:
(SEQ ID NO: 5)
CAAGCAGAAGACGGCATACGAGATCTAGTACGGTCTCGTGGGCTCGG

703:
(SEQ ID NO: 6)
CAAGCAGAAGACGGCATACGAGATTTCTGCCTGTCTCGTGGGCTCGG

704:
(SEQ ID NO: 7)
CAAGCAGAAGACGGCATACGAGATGCTCAGGAGTCTCGTGGGCTCGG

705:
(SEQ ID NO: 8)
CAAGCAGAAGACGGCATACGAGATAGGAGTCCGTCTCGTGGGCTCGG

706:
(SEQ ID NO: 9)
CAAGCAGAAGACGGCATACGAGATCATGCCTAGTCTCGTGGGCTCGG

707:
(SEQ ID NO: 10)
CAAGCAGAAGACGGCATACGAGATGTAGAGAGGTCTCGTGGGCTCGG

708:
(SEQ ID NO: 11)
CAAGCAGAAGACGGCATACGAGATCCTCTCTGGTCTCGTGGGCTCGG

709:
(SEQ ID NO: 12)
CAAGCAGAAGACGGCATACGAGATAGCGTAGCGTCTCGTGGGCTCGG

710:
(SEQ ID NO: 13)
CAAGCAGAAGACGGCATACGAGATCAGCCTCGGTCTCGTGGGCTCGG

711:
(SEQ ID NO: 14)
CAAGCAGAAGACGGCATACGAGATTGCCTCTTGTCTCGTGGGCTCGG

712:
(SEQ ID NO: 15)
CAAGCAGAAGACGGCATACGAGATTCCTCTACGTCTCGTGGGCTCGG

501:
(SEQ ID NO: 16)
AATGATACGGCGACCACCGAGATCTACACTAGATCGCTCGTCGGCAGC

GTC

502:
(SEQ ID NO: 17)
AATGATACGGCGACCACCGAGATCTACACCTCTCTATTCGTCGGCAGC
GTC

503:
(SEQ ID NO: 18)
AATGATACGGCGACCACCGAGATCTACACTATCCTCTTCGTCGGCAG
CGTC

504:
(SEQ ID NO: 19)
AATGATACGGCGACCACCGAGATCTACACAGAGTAGATCGTCGGCAG
CGTC

505:
(SEQ ID NO: 20)
AATGATACGGCGACCACCGAGATCTACACGTAAGGAGTCGTCGGCAG
CGTC

506:
(SEQ ID NO: 21)
AATGATACGGCGACCACCGAGATCTACACACTGCATATCGTCGGCAG
CGTC

507:
(SEQ ID NO: 22)
AATGATACGGCGACCACCGAGATCTACACAAGGAGTATCGTCGGCAG
CGTC

508:
(SEQ ID NO: 23)
AATGATACGGCGACCACCGAGATCTACACCTAAGCCTTCGTCGGCAG
CGTC

Constructs used to generate the data described herein are 5mC modified sequences with n=20 tags of the following sequences. It is to be understood that many other such sets of primer binding site sequences can be designed by those of skill in the art and the following 20 transposon primer binding site sequences is not intended to be limiting in any way.

1.
(SEQ ID NO: 24)
AGAAGMMGTGTGMMGGTMTA 2.
(SEQ ID NO: 25)
ATMGTGMGGAMGAGAMAGMA 3.
(SEQ ID NO: 26)
AATMMTAGMAMMGGTTMGMM 4.
(SEQ ID NO: 27)
AMGTGTTGMAGGTGMAMTMG 5.
(SEQ ID NO: 28)
AMAMMAMAMGGMMTAGAGTM 6.
(SEQ ID NO: 29)
TGGAMAATMAMGMGAMMAGM 7.
(SEQ ID NO: 30)
TMATMTAAMGMGMAMMGTGM 8.
(SEQ ID NO: 31)
TTMGTMGGMTMTMTMGAAMM 9.
(SEQ ID NO: 32)
TGGTGGAGMGTGMAGAMTMT 10.
(SEQ ID NO: 33)
TATMTTMMTGMGMAGMGGAM 11.
(SEQ ID NO: 34)
MTGAMGTGTGAGGMGMTAGA 12.
(SEQ ID NO: 35)
MMATMATMMAAMMGGMTTMG 13.
(SEQ ID NO: 36)
MAMGAGAAGMMGTMMGMTTA 14.
(SEQ ID NO: 37)
MGTAMGTGMAAMAMTMMGMT 15.
(SEQ ID NO: 38)
MTTGGTMAGGMGAGAAGMAM 16.
(SEQ ID NO: 39)
GGMGTGATMAGTGMGTGGAT 17.
(SEQ ID NO: 40)
GAGMGTTTGGTGAMMGMMAT 18.
(SEQ ID NO: 41)
GMMTGMGGTMMATTGAMMTA 19.
(SEQ ID NO: 42)
GTAAGMMAMTMMAGMGTMAM 20.
(SEQ ID NO: 43)
GATMTGTTGMGMGTMTGGTG

Tn5 transposon is constructed from 5'-/Phos/CTGTCTCTTATACACATCT-3' (SEQ ID NO: 1), while the other strand was in the form of 5'-[tag]-AGATGTGTATAAGAGAMAG (SEQ ID NO: 48)-3'. Each of the oligos (IDT, purification: PAGE) was dissolved in 0.1× TE to a final concentration of 100 uM. For each of the n=20 tags, two strands were annealed at a final concentration of 5 uM each. The 20 annealed transposons were then pooled with equal volumes. Second, the transposase was purified after expression from the pTXB1-Tn5 plasmid (Addgene). Transposome was assembled at a final concentration of 1.25 uM dimer (2.5 uM monomer), 1:10 diluted (125 nM dimer, or 250 nM monomer), and aliquoted for single uses and store at −80 C.

20-primer Mix (for use in PCR Mix 1) was in the form of 5'-[tag]AGATGTGTATAAG (SEQ ID NO: 49)-3'. Each of the oligos (IDT, purification: standard desalting) was dissolved in 0.1×TE to a final concentration of 100 uM, and combined with equal volumes (100 uM total, or 5 uM each). Store at −20 C. 40-primer Mix (for use in PCR Mix 2) was in the form of

5'ACACTCTTTCCCTACACGACGCTCTTCCGATCT(SEQ ID NO: 50)-

-continued

[METAtag]AGATGTGTATAAG(SEQ ID NO: 51)-3' for one side of the Illumina adapter, and

5 GACTGGAGTTCAGACGTGTGCTCTTCCGATCT(SEQ ID NO: 52)-

[METAtag]AGATGTGTATAAG(SEQ ID NO: 53)-3' for the other. Each of the oligos (IDT, purification: PAGE) was dissolved in 0.1×TE to a final concentration of 50 uM, and combined with equal volumes (50 uM total, or 1.25 uM each) and stored at −20 C.

For adapter insertion using a transposome whether Nextera or transposomes described herein in a 10 µl reaction, for each single cell, add each of the following reagent in low-bind PCR tubes: A) 2.5 µl lysis sample: B) 5 ul 2× Trans buffer: C) 2.5 µl diluted Tn5 complex and maintain at 55 C for 10 mins and at 4 C constant thereafter.

The transposome reaction is stopped using a stop buffer as follows: Prepare 0.2 mg/ml QP: prepare stop buffer: 1 ul 2× stop buffer: 1 µl 2 mg/ml QP (final 100 ug/ml). Transposition is stopped or halted by running (a 12 uL volume) under conditions of a) 50 C for 40 min; b) 70 C for 20 min, and c) 4 C constant thereafter.

Example V

Gap Filling and Carrier DNA

After transposition and transposase removal, a PCR reaction mixture including $Mg^{2+}$, dNTP mix, primers and a thermal stable DNA polymerase such as Deepvent exo-DNA polymerase (New England Biolabs) is added to the solution at a suitable temperature and for a suitable time period to fill the 9 bp gap left by the transposition reaction. The gap filling incubation temperature and time depends on the specific DNA polymerase used. After the reaction, the DNA polymerase is optionally inactivated by heating and/or protease treatment such as QIAGEN protease. The protease, if used, is then inactivated by heat and/or protease inhibitor. Carrier DNA (dsDNA) is then added to the reaction medium. Carrier DNA present includes DNA fragments between 100 bp and 4000 bp in length such as is created by sonicating lambda DNA. Carrier DNA is present within the reaction medium in an amount of at least 20 ng and between 20 ng and 50 ng.

An exemplary gap-filling procedure is as follows:
1. Prepare dNTP mix within 5-methyl-dCTP (2.5 mM each nt). Add 100 uL 10 mM dTTP (NEB N0443S), 100 uL 10 mM dGTP (NEB N0442S), 100 uL 10 mM dATP (NEB N0440S) to 100 uL 10 mM 5-methyl-dCTP (NEB N0356S) then mix thoroughly by vortexing, store at −20° C.
2. Make PCR Mix (23 uL per cell): a) 7 uL Q5 Reaction Buffer (included with Q5): b) 7 uL Q5 High GC Enhancer (included with Q5): c) 2.8 uL dNTP mix within 5-methyl-dCTP (2.5 mM each nt): d) 0.7 uL 100 mM MgCl2 (Invitrogen AM9530G): e) 0.35 uL Q5 (NEB M0491S): f) 1 ul 20 ng/ul lambda carrier DNA (sonicated 200-300 bp): g) 4.15 µl $H_2O$. Vortex to mix.
3. Add 23 uL PCR Mix per tube, avoiding touching the liquid. Vortex and spin down.

Gap fill by running (35 uL volume) under the following conditions. a) 4 C for 3 min (to allow the lid to pre-heat): b) 65 C for 3 min; c) 4 C store.

For clean up: 1. Add 200 µl binding buffer direct to the pcr tube, mix 10 times, transfer to column (ZYMO DCC): 2. 200 µl wash twice: 3. Elute in 17.8 µl elution buffer (No edta, NEB white cap bottle from EM-seq kit).

Example VI

Chemical or Enzymatic Conversion of Cytosine to Uracil

Carrier DNA (dsDNA) is then added to the reaction medium along with chemical reagents to convert cytosines to uracils. Carrier DNA present during the chemical or enzymatic conversion of cytosine to uracil includes DNA fragments between 100 bp and 4000 bp in length such as is created by sonicating lambda DNA. Carrier DNA is present within the reaction medium in an amount of at least 20 ng and between 20 ng and 50 ng.

Example VII

DNA Fragment Amplification

According to one aspect, general methods known to those of skill in the art are used to amplify a DNA fragment. The chemically converted fragments from the above example are combined with PCR reaction reagents in an aqueous medium. The aqueous medium is then subject to PCR conditions to PCR amplify each DNA fragment.

Example VIII

Sequencing of DNA Fragment Amplicons

According to one aspect, the fragments are sequenced using methods known to those of skill in the art and the sequences are stored in computer readable memory. The sequences then can be compared an assembled into genomic sequences using methods, including software methods, known to those of skill in the art.

Example IX

Single Cell Methylation Detection

Figure 7:
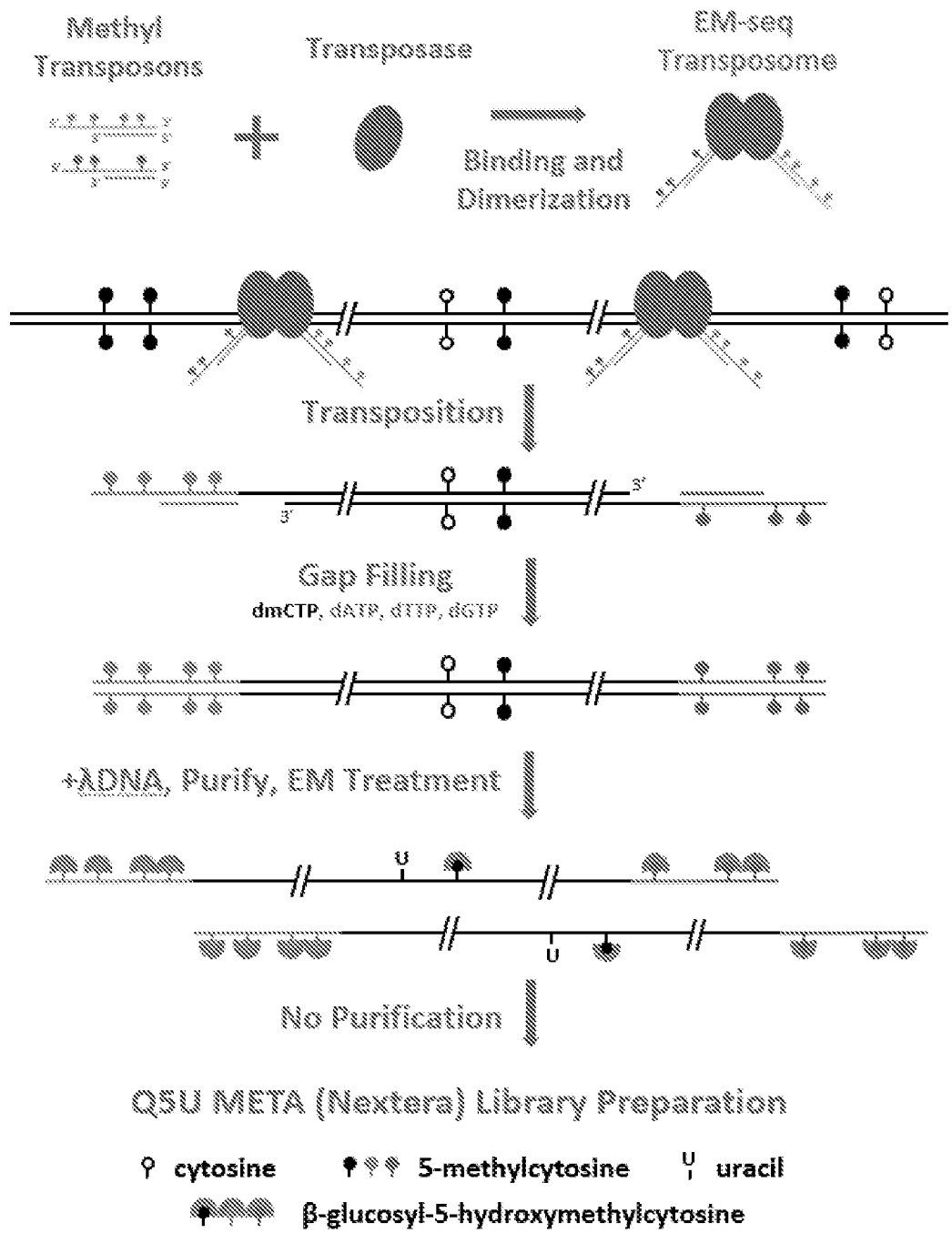
FIG. 7 is a schematic showing the workflow of scEM-seq.

One aspect of the present disclosure is shown in FIG. 7.
(1) Target DNA is extracted from single cells, or 2-cells, or 4-cells, or . . . 100 cells. Such extracted DNA is considered to be in low volume.
(2) Target DNA is fragmented and methyl transposons are inserted or attached using a Tn5 transposome. The transposon primer that binds to Tn5 is fully methylated on every cytosine. The result are fragments of target DNA including fully methylated PCR adaptors.
(3) The fragments are gap filled. After gap filling, carrier DNA is added to the reaction. The carrier DNA is created from lambda DNA which has been sonicated into fragments having 100 bp to 400 bp.
(4) The reaction medium is purified by DNA spin-columns. DNA conversion carried out using EM-seq kit from NEB. The ABOPEC step of the EM-seq kit is modified to reduce the volume to 40 µl.
(5) After the conversion, Q5U polymerase and buffer are directly added to the reaction without DNA purification. Whole-genome amplification is performed by using Nextera PCR primers (if Nextera transposome system is used) or PCR primers as described herein.

(6) After the PCR reaction, the reaction medium is purified to remove single-stranded carrier DNA, and the purified library is ready for DNA sequencing.

Figure 8:
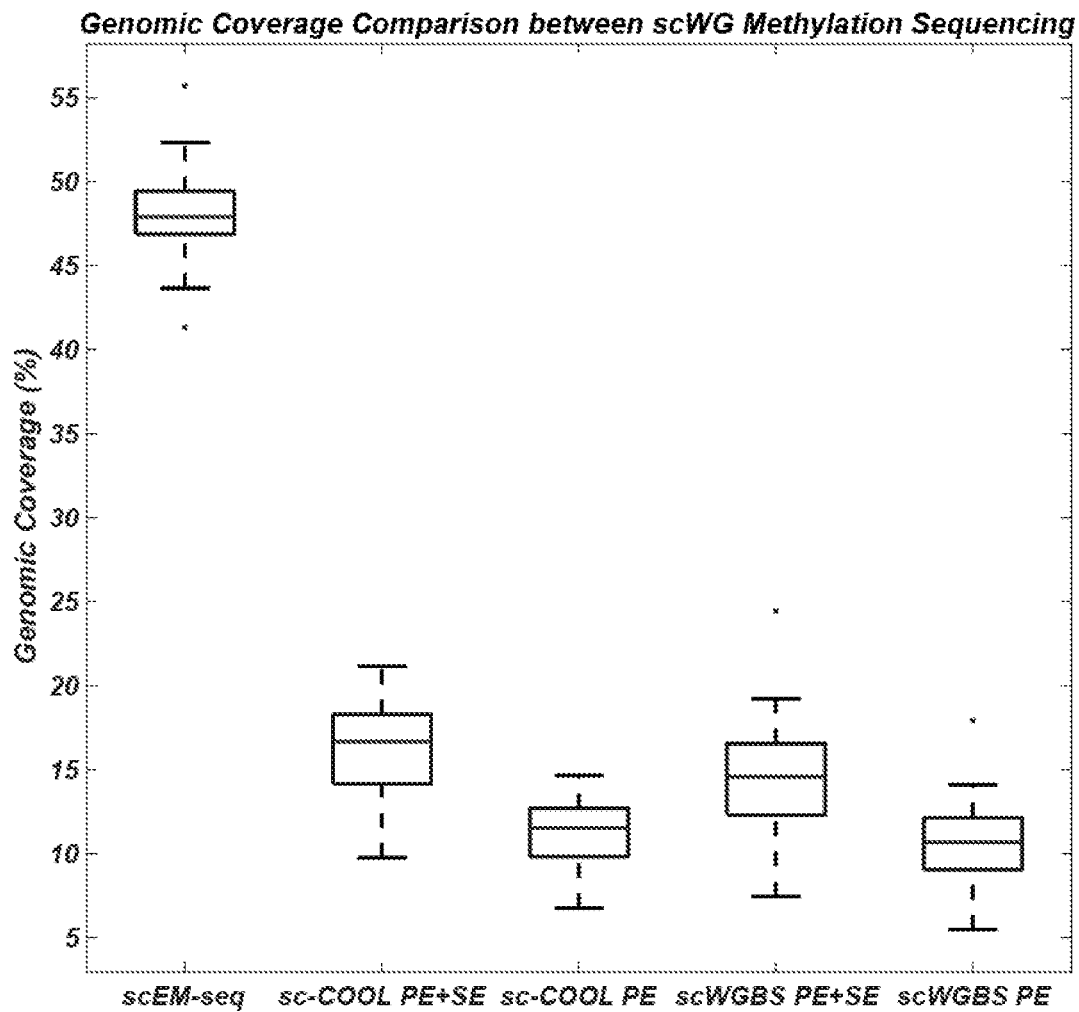
FIG. 8 is the genomic coverage of scEM-seq comparing to sc-COOL seq and scWGBS using different alignment algorithms (PE or PE+SE). PE: using pair-end alignment. PE+SE: using single-end alignment for reads didn't align to the reference genome. scEM-seq and sc-COOL seq is performed on 4-cell stage mouse embryos. scWGBS is performed on mouse ESC.
Figure 9:
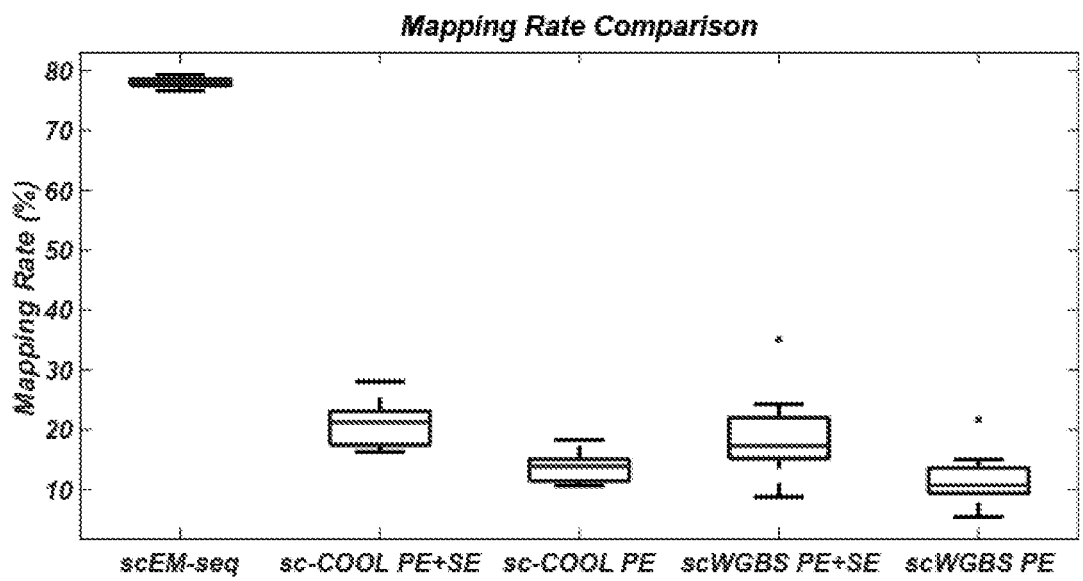
FIG. 9 is the mapping rate comparison between scEM-seq, sc-COOL seq and scWGBS.
Figure 10:
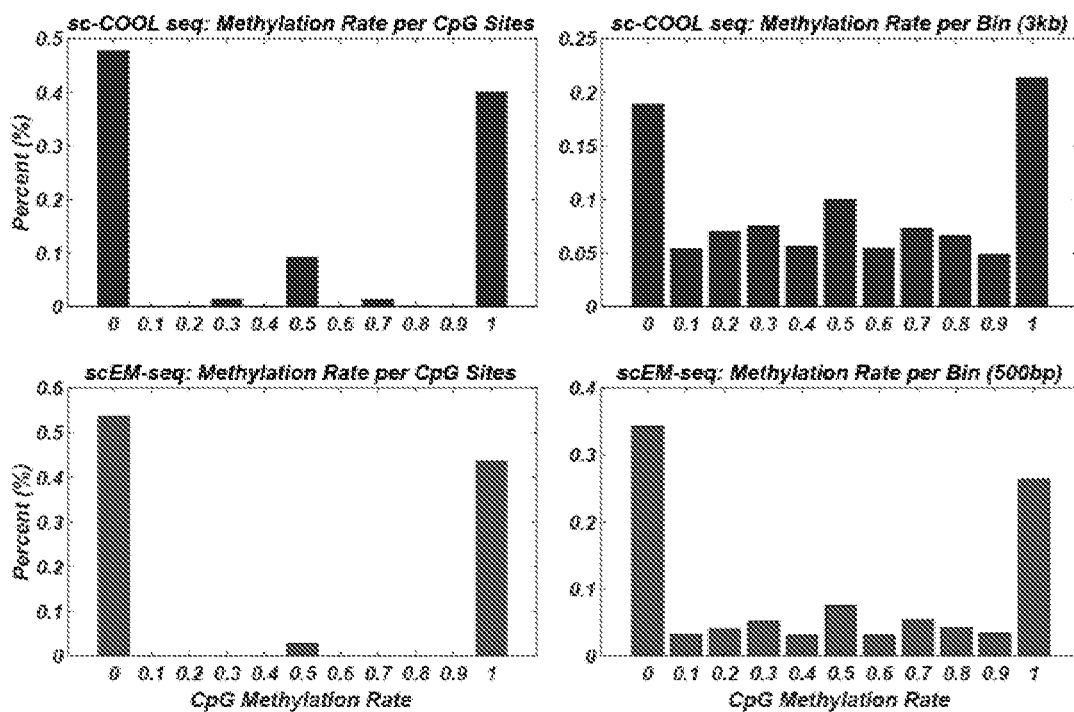
FIG. 10 is the methylation rate distribution comparison between sc-COOL seq and scEM-seq.

As shown in FIG. 8, the method described herein using the transposome approach with carrier DNA resulted in higher genomic coverage compared to an existing single-cell whole methylome sequencing technique. As shown in FIG. 9, the method described herein using the transposome approach with carrier DNA resulted in higher mapping rate compared to an existing single-cell whole methylome sequencing technique. As shown in FIG. 10, the method described herein using the transposome approach with carrier DNA resulted in higher accuracy compared to an existing single-cell whole methylome sequencing technique. Techniques include scWGBS "Smallwood, S. A., Lee, H. J., Angermueller, C., Krueger, F., Saadeh, H., Peat, J., . . . & Kelsey, G. (2014). Single-cell genome-wide bisulfite sequencing for assessing epigenetic heterogeneity. Nature methods, 11(8), 817." and scCOOL-seq "Guo, F., Li, L., Li, J., Wu, X., Hu, B., Zhu, P., . . . & Tang, F. (2017). Single-cell multi-omics sequencing of mouse early embryos and embryonic stem cells. Cell research, 27(8), 967."

Example X

Enzymatic Methyl-Seq Kit Conversion

Oxidation of 5-Methylcytosines and 5-Hydroxymethylcytosines
1. Prepare TET2 Buffer.
Add 100 µl of TET2 Reaction Buffer (included with TET2) to one tube of TET2 Reaction Buffer Supplement (included with TET2) and mix well, then store at −20° C.
2. Prepare Freshly Diluted Iron(II).
Dilute the 500 mM Iron(II) solution (included with TET2) to 0.4 mM with water.
3. On ice, add the 9.6 uL oxidation premix (6 uL reconstituted TET2 Reaction Buffer (included with TET2), 0.6 uL Oxidation Supplement (included with TET2), 0.6 uL Oxidation Enhancer (included with TET2), 2.4 uL TET2 (E7120S)) directly to the 17.4 µl tagmented DNA. Mix thoroughly by vortexing, centrifuge briefly, then add 3 uL 0.4 mM freshly diluted iron (II) to total 30 uL volume. Mix thoroughly by vortexing then centrifuge briefly. Incubate at 37° C. for 1 hour then at 4° C. in a thermocycler. The total volume of the TET reaction is 30 ul which is sufficient for low-input DNA. The total volume may be between 20 ul and 40 ul. The volume in this range advantageously allows the following purification step to be carried out in the same single tube to reduce loss of DNA.
4. Add 0.6 µl of Stop Reagent (included with TET2). Mix thoroughly by vortexing then centrifuge briefly. Incubate at 37° C. for 30 minutes then at 4° C. in a thermocycler.
Clean-Up of Oxidized DNA
1. Add 200 ul binding buffer direct to the PCR tube, mix 10 times, transfer to column (ZYMO DCC)
2. 200 ul wash twice
3. Elute in 12.3 ul elution buffer (No EDTA, NEB white cap bottle from EM-seq kit Column purification of DNA is carried out preferably to beads purification so as to minimize loss of DNA due to purification.
Denaturation of DNA with Sodium Hydroxide
1. Prepare freshly diluted 0.1 N NaOH (Sigma) by adding 1 uL 10M NaOH to 99 uL water.
2. Add 3 µl 0.1 N NaOH to the 12 µl of oxidized DNA. Vortex to mix then centrifuge briefly. Incubate at 50° C. for 10 minutes in the pre-heated thermocycler. Then, place on ice and proceed to next section.
Deamination of Cytosines
1. Dilute the 37% Hydrochloric acid (Sigma 30721) to 0.018M by adding 1.48 µl to 998.52 µl of water.
2. On ice, add 7 uL 0.018M HCl to the 15 µl of denatured DNA.
3. On ice, add the 18 uL deamination premix (13.2 uL water, 4 uL APOBEC Reaction Buffer (included with APOBEC), 0.4 uL BSA (included with APOBEC), 0.4 uL APOBEC (E7120S)). Mix thoroughly by vortexing, centrifuge briefly.
4. Incubate at 37° C. for 3 hours then at 4° C. in a thermocycler.

The volume of the reaction for the denaturation step and ABOPEC reaction is 40 µl and may be between 30 µl and 60 µl. This volume advantageously allows avoidance of a DNA purification step after treatment with APOBEC. PCR can be directly performed by adding 40 µl of PCR buffer mix including DNA polymerase and primers to the 40 µl ABOPEC reaction.

Example XI

Library Preparation Through PCR

Nextera Construct
Combine 40 µl Deamination system, 40 µl Q5U 2× master mix, and 0.4 µl 100 mM nextera index (P5 and P7). Amplify by running (80.8 uL volume): a) 4 C for 3 min (to allow the lid to pre-heat), b) 98 C for 20 s, c) 12 cycles of 98 C for 10 s, 62 C for 30 s, 65 C for 1 min, e) 65° C. for 5 min and f) 4 C constant. 1.2×Beads size selection using AMpure Beads.
META (Multiple End Tagging Amplification) Construct:
Combine the following: META 20-primer Mix, 2 uL: 40 µl DNA elute: 40 µl Q5U 2× master mix: incubation at 98 C for 20 s, 10 cycles of [98 C for 10 s, 62 C for 30 s, 65 C for 1 min], and 65 C for 5 min. The amplification product is purified at this step with 13.8 uL Elution buffer and the sequencing libraries were prepared by two additional PCR steps. In the first PCR step, PCR was performed by the addition of 16.5 uL PCR Mix 2 (15 µl Q5U 2× master mix and 1.5 uL 40-primer Mix) and incubation at 98 C for 30 s, 2 cycles of 98 C for 10 s+62 C for 30 s+65 C for 1 min, and 65 C for 5 min. In the second PCR step, primers were similarly removed by the addition of 1 uL 20 U/uL ExoI (NEB M0293S) and incubation at 37 C for 30 min, 72 C for 20 min. PCR was similarly performed by the addition of 2.5 uL NEB Index Primer (NEB E7335S, E7500S, E7710S, E7730S) and 6.5 uL PCR Mix 3 (5 uL Q5U 2× master mix (NEB), 1.25 uL water, 0.25 uL Universal Primer (IDT, purification: PAGE)) and incubation at 98 C for 30 s, 2 or more cycles of 98 C for 10 s+62 C for 30 s+65 C for 1 min, and 65 C for 5 min. Libraries could be pooled at this step or at any step afterwards. 1.2× AMpure beads is used for size selection.

Example IX

Kits

The materials and reagents required for the disclosed amplification method may be assembled together in a kit. The kits of the present disclosure generally will include at least the transposome (consists of transposase enzyme and transposon DNA), nucleotides, DNA polymerase, carrier DNA and chemical reagents to convert cytosine to uracil or 5-methylcytosine to uracil, necessary to carry out the claimed method along with primer sets as needed. In a preferred embodiment, the kit will also contain directions for amplifying DNA from DNA samples. Exemplary kits are those suitable for use in amplifying whole genomic DNA. In each case, the kits will preferably have distinct containers for each individual reagent, enzyme or reactant. Each agent will generally be suitably aliquoted in their respective containers. The container means of the kits will generally include at least one vial or test tube. Flasks, bottles, and other container means into which the reagents are placed and aliquoted are also possible. The individual containers of the kit will preferably be maintained in close confinement for commercial sale. Suitable larger containers may include injection or blow-molded plastic containers into which the desired vials are retained. Instructions are preferably provided with the kit.

What is claimed is:

1. A method of analyzing methylation characteristics of target genomic DNA comprising:
   contacting genomic DNA with a library of transposomes with each transposome of the library having two transposases and two transposon DNA, wherein each transposon DNA includes a transposase binding site and a primer binding site sequence, wherein the primer binding site sequence is different from the primer binding site of other members of the transposome library, wherein each transposon DNA includes one or more 5-methylcytosines, wherein each transposome within the library of transposomes includes two different primer binding site sequences, and
   wherein the library of transposomes bind to target locations along the genomic DNA and the transposase cleaves the genomic DNA into a plurality of double stranded genomic DNA fragments representing a genomic DNA fragment library, with each double stranded genomic DNA fragment includes one or more cytosines and/or one or more 5-methylcytosines and a unique and different primer binding site sequence on each end of the genomic DNA fragment;
   filling a gap between the transposon DNA and the genomic DNA fragment to form a library of double stranded genomic DNA fragment extension products having unique and different primer binding site sequences at each end;
   treating the library of double stranded genomic DNA fragment extension products to convert cytosine to uracil in the presence of carrier DNA, wherein the carrier DNA is 100 to 10,000 times more in amount than the genomic DNA;
   amplifying the double stranded genomic DNA fragment extension products to produce amplicons; and
   sequencing the amplicons.

2. The method of claim 1 wherein the genomic DNA is whole genomic DNA obtained from a single cell.

3. The method of claim 1 wherein the transposase is Tn5 transposase, Mu transposase, Tn7 transposase or IS5 transposase.

4. The method of claim 1 wherein the transposon DNA includes a double-stranded 19 bp Tnp transposase binding site and an overhang, wherein the overhang includes a unique and different primer binding site sequence at the 5' end of the overhang.

5. The method of claim 1 wherein bound transposases are removed from the double stranded fragments before gap filling and extending of the double stranded genomic DNA fragments.

6. The method of claim 1 wherein the genomic DNA is from a prenatal cell, a cancer cell, or a circulating tumor cell.

7. The method of claim 1 wherein the genomic DNA is from a single prenatal cell, a single cancer cell, or a single circulating tumor cell.

8. The method of claim 1 wherein the unique and different primer binding site sequence is a specific polymerase chain reaction (PCR) primer binding site.

9. The method of claim 1 wherein the different primer binding site sequences are orthogonal.

10. The method of claim 1 wherein the transposon DNA is methylated at every cytosine.

11. The method of claim 1 wherein the transposon DNA includes methylated cytosine adapters.

12. The method of claim 11 wherein the gap filling step includes using methylated dCTP instead of dCTP in the dNTP mix.

13. The method of claim 1 further including a step after the gap filling step but before the conversion step: purifying the library of the gap-filled double stranded segments and carrier DNA.

14. The method of claim 13 wherein the purifying step is performed by DNA spin-columns or beads-based DNA purification.

15. The method of claim 1 wherein the library of the gap-filled double stranded segments and carrier DNA proceed directly to the conversion step without purification.

16. The method of claim 1 wherein a reagent is used to convert cytosine to uracil, and the reagent is not bisulfite or excludes bisulfite.

17. The method of claim 1 further including a step after the conversion step but before the amplification step: purifying the library of the converted fragments.

18. The method of claim 1 wherein the library of the converted fragments is proceed directly to the amplification step without purification.

19. The method of claim 1 wherein the library of transposomes includes 1 to 100, 1 to 10, 5 to 50, 30 to 100, 15 to 25, 100 to 1,000, 1,000 to 10,000, or 10,000 to 100,000 unique and different primer binding site sequences.

20. The method of claim 1, which is characterized by one or more of the following:
   (i) the carrier DNA is selected from the group consisting of dsDNA fragments having a length between 100 base pairs (bp) to 4 kilo base pairs;
   (ii) the carrier DNA is a DNA type that is different from or the same as the target DNA; and
   (iii) the carrier DNA is sonicated lambda DNA.

* * * * *

SEQUENCE LISTING

```
<160> NUMBER OF SEQ ID NOS: 53

<210> SEQ ID NO 1
<211> LENGTH: 19
<212> TYPE: DNA
<213> ORGANISM: artificial sequence
<220> FEATURE:
<223> OTHER INFORMATION: one strand of Nextera transposon

<400> SEQUENCE: 1
ctgtctctta tacacatct                                                    19

<210> SEQ ID NO 2
<211> LENGTH: 33
<212> TYPE: DNA
<213> ORGANISM: artificial sequence
<220> FEATURE:
<223> OTHER INFORMATION: one 5mC modified strand of Nextera transposon
      P5
<220> FEATURE:
<221> NAME/KEY: modified_base
<222> LOCATION: (2)..(2)
<223> OTHER INFORMATION: n is methylated cytosine
<220> FEATURE:
<221> NAME/KEY: modified_base
<222> LOCATION: (5)..(5)
<223> OTHER INFORMATION: n is methylated cytosine
<220> FEATURE:
<221> NAME/KEY: modified_base
<222> LOCATION: (8)..(8)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (14)..(14)
<223> OTHER INFORMATION: n is methylated cytosine
<220> FEATURE:
<221> NAME/KEY: modified_base
<222> LOCATION: (31)..(31)
<223> OTHER INFORMATION: n is methylated cytosine

<400> SEQUENCE: 2
tngtnggnag ngtnagatgt gtataagaga nag                                    33

<210> SEQ ID NO 3
<211> LENGTH: 34
<212> TYPE: DNA
<213> ORGANISM: artificial sequence
<220> FEATURE:
<223> OTHER INFORMATION: one 5mC modified strand of Nextera transposon
      P7
<220> FEATURE:
<221> NAME/KEY: modified_base
<222> LOCATION: (3)..(3)
<223> OTHER INFORMATION: n is methylated cytosine
<220> FEATURE:
<221> NAME/KEY: modified_base
<222> LOCATION: (5)..(5)
```

```
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (13)..(13)
<223> OTHER INFORMATION: n is methylated cytosine
<220> FEATURE:
<221> NAME/KEY: modified_base
<222> LOCATION: (32)..(32)
<223> OTHER INFORMATION: n is methylated cytosine

<400> SEQUENCE: 3
gtntngtggg ntnggagatg tgtataagag anag                                34

<210> SEQ ID NO 4
<211> LENGTH: 47
<212> TYPE: DNA
<213> ORGANISM: artificial sequence
<220> FEATURE:
<223> OTHER INFORMATION: Nextera index primer

<400> SEQUENCE: 4
caagcagaag acggcatacg agattcgcct tagtctcgtg ggctcgg                  47

<210> SEQ ID NO 5
<211> LENGTH: 47
<212> TYPE: DNA
<213> ORGANISM: artificial sequence
<220> FEATURE:
<223> OTHER INFORMATION: Nextera index primer

<400> SEQUENCE: 5
caagcagaag acggcatacg agatctagta cggtctcgtg ggctcgg                  47

<210> SEQ ID NO 6
<211> LENGTH: 47
<212> TYPE: DNA
<213> ORGANISM: artificial sequence
<220> FEATURE:
<223> OTHER INFORMATION: Nextera index primer

<400> SEQUENCE: 6
caagcagaag acggcatacg agatttctgc ctgtctcgtg ggctcgg                  47

<210> SEQ ID NO 7
<211> LENGTH: 47
<212> TYPE: DNA
<213> ORGANISM: artificial sequence
<220> FEATURE:
<223> OTHER INFORMATION: Nextera index primer

<400> SEQUENCE: 7
caagcagaag acggcatacg agatgctcag gagtctcgtg ggctcgg                  47

<210> SEQ ID NO 8
<211> LENGTH: 47
<212> TYPE: DNA
<213> ORGANISM: artificial sequence
<220> FEATURE:
<223> OTHER INFORMATION: Nextera index primer

<400> SEQUENCE: 8
caagcagaag acggcatacg agataggagt ccgtctcgtg ggctcgg                  47
```

```
<210> SEQ ID NO 9
<211> LENGTH: 47
<212> TYPE: DNA
<213> ORGANISM: artificial sequence
<220> FEATURE:
<223> OTHER INFORMATION: Nextera index primer

<400> SEQUENCE: 9
caagcagaag acggcatacg agatcatgcc tagtctcgtg ggctcgg          47

<210> SEQ ID NO 10
<211> LENGTH: 47
<212> TYPE: DNA
<213> ORGANISM: artificial sequence
<220> FEATURE:
<223> OTHER INFORMATION: Nextera index primer

<400> SEQUENCE: 10
caagcagaag acggcatacg agatgtagag aggtctcgtg ggctcgg          47

<210> SEQ ID NO 11
<211> LENGTH: 47
<212> TYPE: DNA
<213> ORGANISM: artificial sequence
<220> FEATURE:
<223> OTHER INFORMATION: Nextera index primer

<400> SEQUENCE: 11
caagcagaag acggcatacg agatcctctc tggtctcgtg ggctcgg          47

<210> SEQ ID NO 12
<211> LENGTH: 47
<212> TYPE: DNA
<213> ORGANISM: artificial sequence
<220> FEATURE:
<223> OTHER INFORMATION: Nextera index primer

<400> SEQUENCE: 12
caagcagaag acggcatacg agatagcgta gcgtctcgtg ggctcgg          47

<210> SEQ ID NO 13
<211> LENGTH: 47
<212> TYPE: DNA
<213> ORGANISM: artificial sequence
<220> FEATURE:
<223> OTHER INFORMATION: Nextera index primer

<400> SEQUENCE: 13
caagcagaag acggcatacg agatcagcct cggtctcgtg ggctcgg          47

<210> SEQ ID NO 14
<211> LENGTH: 47
<212> TYPE: DNA
<213> ORGANISM: artificial sequence
<220> FEATURE:
<223> OTHER INFORMATION: Nextera index primer

<400> SEQUENCE: 14
caagcagaag acggcatacg agattgcctc ttgtctcgtg ggctcgg          47

<210> SEQ ID NO 15
<211> LENGTH: 47
<212> TYPE: DNA
<213> ORGANISM: artificial sequence
<220> FEATURE:
<223> OTHER INFORMATION: Nextera index primer
```

<400> SEQUENCE: 15
caagcagaag acggcatacg agattcctct acgtctcgtg ggctcgg      47

<210> SEQ ID NO 16
<211> LENGTH: 51
<212> TYPE: DNA
<213> ORGANISM: artificial sequence
<220> FEATURE:
<223> OTHER INFORMATION: Nextera index primer

<400> SEQUENCE: 16
aatgatacgg cgaccaccga gatctacact agatcgctcg tcggcagcgt c      51

<210> SEQ ID NO 17
<211> LENGTH: 51
<212> TYPE: DNA
<213> ORGANISM: artificial sequence
<220> FEATURE:
<223> OTHER INFORMATION: Nextera index primer

<400> SEQUENCE: 17
aatgatacgg cgaccaccga gatctacacc tctctattcg tcggcagcgt c      51

<210> SEQ ID NO 18
<211> LENGTH: 51
<212> TYPE: DNA
<213> ORGANISM: artificial sequence
<220> FEATURE:
<223> OTHER INFORMATION: Nextera index primer

<400> SEQUENCE: 18
aatgatacgg cgaccaccga gatctacact atcctcttcg tcggcagcgt c      51

<210> SEQ ID NO 19
<211> LENGTH: 51
<212> TYPE: DNA
<213> ORGANISM: artificial sequence
<220> FEATURE:
<223> OTHER INFORMATION: Nextera index primer

<400> SEQUENCE: 19
aatgatacgg cgaccaccga gatctacaca gagtagatcg tcggcagcgt c      51

<210> SEQ ID NO 20
<211> LENGTH: 51
<212> TYPE: DNA
<213> ORGANISM: artificial sequence
<220> FEATURE:
<223> OTHER INFORMATION: Nextera index primer

<400> SEQUENCE: 20
aatgatacgg cgaccaccga gatctacacg taaggagtcg tcggcagcgt c      51

<210> SEQ ID NO 21
<211> LENGTH: 51
<212> TYPE: DNA
<213> ORGANISM: artificial sequence
<220> FEATURE:
<223> OTHER INFORMATION: Nextera index primer

<400> SEQUENCE: 21
aatgatacgg cgaccaccga gatctacaca ctgcatatcg tcggcagcgt c      51

<210> SEQ ID NO 22
<211> LENGTH: 51

```
<212> TYPE: DNA
<213> ORGANISM: artificial sequence
<220> FEATURE:
<223> OTHER INFORMATION: Nextera index primer

<400> SEQUENCE: 22
aatgatacgg cgaccaccga gatctacaca aggagtatcg tcggcagcgt c    51

<210> SEQ ID NO 23
<211> LENGTH: 51
<212> TYPE: DNA
<213> ORGANISM: artificial sequence
<220> FEATURE:
<223> OTHER INFORMATION: Nextera index primer

<400> SEQUENCE: 23
aatgatacgg cgaccaccga gatctacacc taagccttcg tcggcagcgt c    51

<210> SEQ ID NO 24
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (6)..(7)
<223> OTHER INFORMATION: n is methylated cytosine
<220> FEATURE:
<221> NAME/KEY: modified_base
<222> LOCATION: (13)..(14)
<223> OTHER INFORMATION: n is methylated cytosine
<220> FEATURE:
<221> NAME/KEY: modified_base
<222> LOCATION: (18)..(18)
<223> OTHER INFORMATION: n is methylated cytosine

<400> SEQUENCE: 24
agaagnngtg tgnnggtnta                                       20

<210> SEQ ID NO 25
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (3)..(3)
<223> OTHER INFORMATION: n is methylated cytosine
<220> FEATURE:
<221> NAME/KEY: modified_base
<222> LOCATION: (7)..(7)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (16)..(16)
<223> OTHER INFORMATION: n is methylated cytosine
<220> FEATURE:
<221> NAME/KEY: modified_base
<222> LOCATION: (19)..(19)
<223> OTHER INFORMATION: n is methylated cytosine

<400> SEQUENCE: 25
atngtgngga ngaganagna                                       20

<210> SEQ ID NO 26
```

```
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (4)..(5)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (11)..(12)
<223> OTHER INFORMATION: n is methylated cytosine
<220> FEATURE:
<221> NAME/KEY: modified_base
<222> LOCATION: (17)..(17)
<223> OTHER INFORMATION: n is methylated cytosine
<220> FEATURE:
<221> NAME/KEY: modified_base
<222> LOCATION: (19)..(20)
<223> OTHER INFORMATION: n is methylated cytosine

<400> SEQUENCE: 26
aatnntagna nnggttngnn                                        20

<210> SEQ ID NO 27
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (2)..(2)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (15)..(15)
<223> OTHER INFORMATION: n is methylated cytosine
<220> FEATURE:
<221> NAME/KEY: modified_base
<222> LOCATION: (17)..(17)
<223> OTHER INFORMATION: n is methylated cytosine
<220> FEATURE:
<221> NAME/KEY: modified_base
<222> LOCATION: (19)..(19)
<223> OTHER INFORMATION: n is methylated cytosine

<400> SEQUENCE: 27
angtgttgna ggtgnantng                                        20

<210> SEQ ID NO 28
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (2)..(2)
<223> OTHER INFORMATION: n is methylated cytosine
<220> FEATURE:
<221> NAME/KEY: modified_base
<222> LOCATION: (4)..(5)
<223> OTHER INFORMATION: n is methylated cytosine
<220> FEATURE:
<221> NAME/KEY: modified_base
```

```
<222> LOCATION: (7)..(7)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (12)..(13)
<223> OTHER INFORMATION: n is methylated cytosine
<220> FEATURE:
<221> NAME/KEY: modified_base
<222> LOCATION: (20)..(20)
<223> OTHER INFORMATION: n is methylated cytosine

<400> SEQUENCE: 28
anannanang gnntagagtn                                       20

<210> SEQ ID NO 29
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (5)..(5)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (13)..(13)
<223> OTHER INFORMATION: n is methylated cytosine
<220> FEATURE:
<221> NAME/KEY: modified_base
<222> LOCATION: (16)..(17)
<223> OTHER INFORMATION: n is methylated cytosine
<220> FEATURE:
<221> NAME/KEY: modified_base
<222> LOCATION: (20)..(20)
<223> OTHER INFORMATION: n is methylated cytosine

<400> SEQUENCE: 29
tgganaatna ngngannagn                                       20

<210> SEQ ID NO 30
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (2)..(2)
<223> OTHER INFORMATION: n is methylated cytosine
<220> FEATURE:
<221> NAME/KEY: modified_base
<222> LOCATION: (5)..(5)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
```

```
<221> NAME/KEY: modified_base
<222> LOCATION: (13)..(13)
<223> OTHER INFORMATION: n is methylated cytosine
<220> FEATURE:
<221> NAME/KEY: modified_base
<222> LOCATION: (15)..(16)
<223> OTHER INFORMATION: n is methylated cytosine
<220> FEATURE:
<221> NAME/KEY: modified_base
<222> LOCATION: (20)..(20)
<223> OTHER INFORMATION: n is methylated cytosine

<400> SEQUENCE: 30
tnatntaang ngnanngtgn                                              20

<210> SEQ ID NO 31
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (3)..(3)
<223> OTHER INFORMATION: n is methylated cytosine
<220> FEATURE:
<221> NAME/KEY: modified_base
<222> LOCATION: (6)..(6)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (13)..(13)
<223> OTHER INFORMATION: n is methylated cytosine
<220> FEATURE:
<221> NAME/KEY: modified_base
<222> LOCATION: (15)..(15)
<223> OTHER INFORMATION: n is methylated cytosine
<220> FEATURE:
<221> NAME/KEY: modified_base
<222> LOCATION: (19)..(20)
<223> OTHER INFORMATION: n is methylated cytosine

<400> SEQUENCE: 31
ttngtnggnt ntntngaann                                              20

<210> SEQ ID NO 32
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (13)..(13)
<223> OTHER INFORMATION: n is methylated cytosine
<220> FEATURE:
<221> NAME/KEY: modified_base
<222> LOCATION: (17)..(17)
<223> OTHER INFORMATION: n is methylated cytosine
<220> FEATURE:
<221> NAME/KEY: modified_base
<222> LOCATION: (19)..(19)
<223> OTHER INFORMATION: n is methylated cytosine
```

```
<400> SEQUENCE: 32
tggtggagng tgnagantnt                                                    20

<210> SEQ ID NO 33
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (4)..(4)
<223> OTHER INFORMATION: n is methylated cytosine
<220> FEATURE:
<221> NAME/KEY: modified_base
<222> LOCATION: (7)..(8)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (13)..(13)
<223> OTHER INFORMATION: n is methylated cytosine
<220> FEATURE:
<221> NAME/KEY: modified_base
<222> LOCATION: (16)..(16)
<223> OTHER INFORMATION: n is methylated cytosine
<220> FEATURE:
<221> NAME/KEY: modified_base
<222> LOCATION: (20)..(20)
<223> OTHER INFORMATION: n is methylated cytosine

<400> SEQUENCE: 33
tatnttnntg ngnagnggan                                                    20

<210> SEQ ID NO 34
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (1)..(1)
<223> OTHER INFORMATION: n is methylated cytosine
<220> FEATURE:
<221> NAME/KEY: modified_base
<222> LOCATION: (5)..(5)
<223> OTHER INFORMATION: n is methylated cytosine
<220> FEATURE:
<221> NAME/KEY: modified_base
<222> LOCATION: (14)..(14)
<223> OTHER INFORMATION: n is methylated cytosine
<220> FEATURE:
<221> NAME/KEY: modified_base
<222> LOCATION: (16)..(16)
<223> OTHER INFORMATION: n is methylated cytosine

<400> SEQUENCE: 34
ntgangtgtg aggngntaga                                                    20

<210> SEQ ID NO 35
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (1)..(2)
```

<223> OTHER INFORMATION: n is methylated cytosine
<220> FEATURE:
<221> NAME/KEY: modified_base
<222> LOCATION: (5)..(5)
<223> OTHER INFORMATION: n is methylated cytosine
<220> FEATURE:
<221> NAME/KEY: modified_base
<222> LOCATION: (8)..(9)
<223> OTHER INFORMATION: n is methylated cytosine
<220> FEATURE:
<221> NAME/KEY: modified_base
<222> LOCATION: (12)..(13)
<223> OTHER INFORMATION: n is methylated cytosine
<220> FEATURE:
<221> NAME/KEY: modified_base
<222> LOCATION: (16)..(16)
<223> OTHER INFORMATION: n is methylated cytosine
<220> FEATURE:
<221> NAME/KEY: modified_base
<222> LOCATION: (19)..(19)
<223> OTHER INFORMATION: n is methylated cytosine

<400> SEQUENCE: 35
nnatnatnna annggnttng                                           20

<210> SEQ ID NO 36
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (1)..(1)
<223> OTHER INFORMATION: n is methylated cytosine
<220> FEATURE:
<221> NAME/KEY: modified_base
<222> LOCATION: (3)..(3)
<223> OTHER INFORMATION: n is methylated cytosine
<220> FEATURE:
<221> NAME/KEY: modified_base
<222> LOCATION: (10)..(11)
<223> OTHER INFORMATION: n is methylated cytosine
<220> FEATURE:
<221> NAME/KEY: modified_base
<222> LOCATION: (14)..(15)
<223> OTHER INFORMATION: n is methylated cytosine
<220> FEATURE:
<221> NAME/KEY: modified_base
<222> LOCATION: (17)..(17)
<223> OTHER INFORMATION: n is methylated cytosine

<400> SEQUENCE: 36
nangagaagn ngtnngntta                                           20

<210> SEQ ID NO 37
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (1)..(1)
<223> OTHER INFORMATION: n is methylated cytosine
<220> FEATURE:
<221> NAME/KEY: modified_base
<222> LOCATION: (5)..(5)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base

```
<222> LOCATION: (12)..(12)
<223> OTHER INFORMATION: n is methylated cytosine
<220> FEATURE:
<221> NAME/KEY: modified_base
<222> LOCATION: (14)..(14)
<223> OTHER INFORMATION: n is methylated cytosine
<220> FEATURE:
<221> NAME/KEY: modified_base
<222> LOCATION: (16)..(17)
<223> OTHER INFORMATION: n is methylated cytosine
<220> FEATURE:
<221> NAME/KEY: modified_base
<222> LOCATION: (19)..(19)
<223> OTHER INFORMATION: n is methylated cytosine

<400> SEQUENCE: 37
ngtangtgna anantnngnt                                              20

<210> SEQ ID NO 38
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (1)..(1)
<223> OTHER INFORMATION: n is methylated cytosine
<220> FEATURE:
<221> NAME/KEY: modified_base
<222> LOCATION: (7)..(7)
<223> OTHER INFORMATION: n is methylated cytosine
<220> FEATURE:
<221> NAME/KEY: modified_base
<222> LOCATION: (11)..(11)
<223> OTHER INFORMATION: n is methylated cytosine
<220> FEATURE:
<221> NAME/KEY: modified_base
<222> LOCATION: (18)..(18)
<223> OTHER INFORMATION: n is methylated cytosine
<220> FEATURE:
<221> NAME/KEY: modified_base
<222> LOCATION: (20)..(20)
<223> OTHER INFORMATION: n is methylated cytosine

<400> SEQUENCE: 38
nttggtnagg ngagaagnan                                              20

<210> SEQ ID NO 39
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (3)..(3)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (14)..(14)
<223> OTHER INFORMATION: n is methylated cytosine

<400> SEQUENCE: 39
ggngtgatna gtgngtggat                                              20

<210> SEQ ID NO 40
<211> LENGTH: 20
<212> TYPE: DNA
```

```
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (4)..(4)
<223> OTHER INFORMATION: n is methylated cytosine
<220> FEATURE:
<221> NAME/KEY: modified_base
<222> LOCATION: (14)..(15)
<223> OTHER INFORMATION: n is methylated cytosine
<220> FEATURE:
<221> NAME/KEY: modified_base
<222> LOCATION: (17)..(18)
<223> OTHER INFORMATION: n is methylated cytosine

<400> SEQUENCE: 40
gagngtttgg tganngnnat                                         20

<210> SEQ ID NO 41
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (2)..(3)
<223> OTHER INFORMATION: n is methylated cytosine
<220> FEATURE:
<221> NAME/KEY: modified_base
<222> LOCATION: (6)..(6)
<223> OTHER INFORMATION: n is methylated cytosine
<220> FEATURE:
<221> NAME/KEY: modified_base
<222> LOCATION: (10)..(11)
<223> OTHER INFORMATION: n is methylated cytosine
<220> FEATURE:
<221> NAME/KEY: modified_base
<222> LOCATION: (17)..(18)
<223> OTHER INFORMATION: n is methylated cytosine

<400> SEQUENCE: 41
gnntgnggtn nattganntA                                         20

<210> SEQ ID NO 42
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (6)..(7)
<223> OTHER INFORMATION: n is methylated cytosine
<220> FEATURE:
<221> NAME/KEY: modified_base
<222> LOCATION: (9)..(9)
<223> OTHER INFORMATION: n is methylated cytosine
<220> FEATURE:
<221> NAME/KEY: modified_base
<222> LOCATION: (11)..(12)
<223> OTHER INFORMATION: n is methylated cytosine
<220> FEATURE:
<221> NAME/KEY: modified_base
<222> LOCATION: (15)..(15)
<223> OTHER INFORMATION: n is methylated cytosine
<220> FEATURE:
<221> NAME/KEY: modified_base
<222> LOCATION: (18)..(18)
<223> OTHER INFORMATION: n is methylated cytosine
<220> FEATURE:
<221> NAME/KEY: modified_base
<222> LOCATION: (20)..(20)
<223> OTHER INFORMATION: n is methylated cytosine
```

<400> SEQUENCE: 42
gtaagnnant nnagngtnan                                                    20

<210> SEQ ID NO 43
<211> LENGTH: 20
<212> TYPE: DNA
<213> ORGANISM: artificial sequence
<220> FEATURE:
<223> OTHER INFORMATION: transposon primer binding site sequence
<220> FEATURE:
<221> NAME/KEY: modified_base
<222> LOCATION: (4)..(4)
<223> OTHER INFORMATION: n is methylated cytosine
<220> FEATURE:
<221> NAME/KEY: modified_base
<222> LOCATION: (10)..(10)
<223> OTHER INFORMATION: n is methylated cytosine
<220> FEATURE:
<221> NAME/KEY: modified_base
<222> LOCATION: (12)..(12)
<223> OTHER INFORMATION: n is methylated cytosine
<220> FEATURE:
<221> NAME/KEY: modified_base
<222> LOCATION: (15)..(15)
<223> OTHER INFORMATION: n is methylated cytosine

<400> SEQUENCE: 43
gatntgttgn gngtntggtg                                                    20

<210> SEQ ID NO 44
<211> LENGTH: 24
<212> TYPE: DNA
<213> ORGANISM: artificial sequence
<220> FEATURE:
<223> OTHER INFORMATION: synthetic sequence

<400> SEQUENCE: 44
caagcagaag acggcatacg agat                                               24

<210> SEQ ID NO 45
<211> LENGTH: 15
<212> TYPE: DNA
<213> ORGANISM: artificial sequence
<220> FEATURE:
<223> OTHER INFORMATION: synthetic sequence

<400> SEQUENCE: 45
gtctcgtggg ctcgg                                                         15

<210> SEQ ID NO 46
<211> LENGTH: 29
<212> TYPE: DNA
<213> ORGANISM: artificial sequence
<220> FEATURE:
<223> OTHER INFORMATION: synthetic sequence

<400> SEQUENCE: 46
aatgatacgg cgaccaccga gatctacac                                          29

<210> SEQ ID NO 47
<211> LENGTH: 14
<212> TYPE: DNA
<213> ORGANISM: artificial sequence
<220> FEATURE:
<223> OTHER INFORMATION: synthetic sequence

<400> SEQUENCE: 47
tcgtcggcag cgtc                                                   14

<210> SEQ ID NO 48
<211> LENGTH: 19
<212> TYPE: DNA
<213> ORGANISM: artificial sequence
<220> FEATURE:
<223> OTHER INFORMATION: synthetic sequence

<400> SEQUENCE: 48
agatgtgtat aagagamag                                              19

<210> SEQ ID NO 49
<211> LENGTH: 13
<212> TYPE: DNA
<213> ORGANISM: artificial sequence
<220> FEATURE:
<223> OTHER INFORMATION: synthetic sequence

<400> SEQUENCE: 49
agatgtgtat aag                                                    13

<210> SEQ ID NO 50
<211> LENGTH: 33
<212> TYPE: DNA
<213> ORGANISM: artificial sequence
<220> FEATURE:
<223> OTHER INFORMATION: synthetic sequence

<400> SEQUENCE: 50
acactctttc cctacacgac gctcttccga tct                              33

<210> SEQ ID NO 51
<211> LENGTH: 13
<212> TYPE: DNA
<213> ORGANISM: artificial sequence
<220> FEATURE:
<223> OTHER INFORMATION: synthetic sequence

<400> SEQUENCE: 51
agatgtgtat aag                                                    13

<210> SEQ ID NO 52
<211> LENGTH: 32
<212> TYPE: DNA
<213> ORGANISM: artificial sequence
<220> FEATURE:
<223> OTHER INFORMATION: synthetic sequence

<400> SEQUENCE: 52
gactggagtt cagacgtgtg ctcttccgat ct                               32

<210> SEQ ID NO 53
<211> LENGTH: 13
<212> TYPE: DNA
<213> ORGANISM: artificial sequence
<220> FEATURE:
<223> OTHER INFORMATION: synthetic sequence

<400> SEQUENCE: 53
agatgtgtat aag                                                    13